April 10, 1951
M. RONNING ET AL
2,548,559
BALING MACHINE
Filed April 13, 1944
12 Sheets-Sheet 6
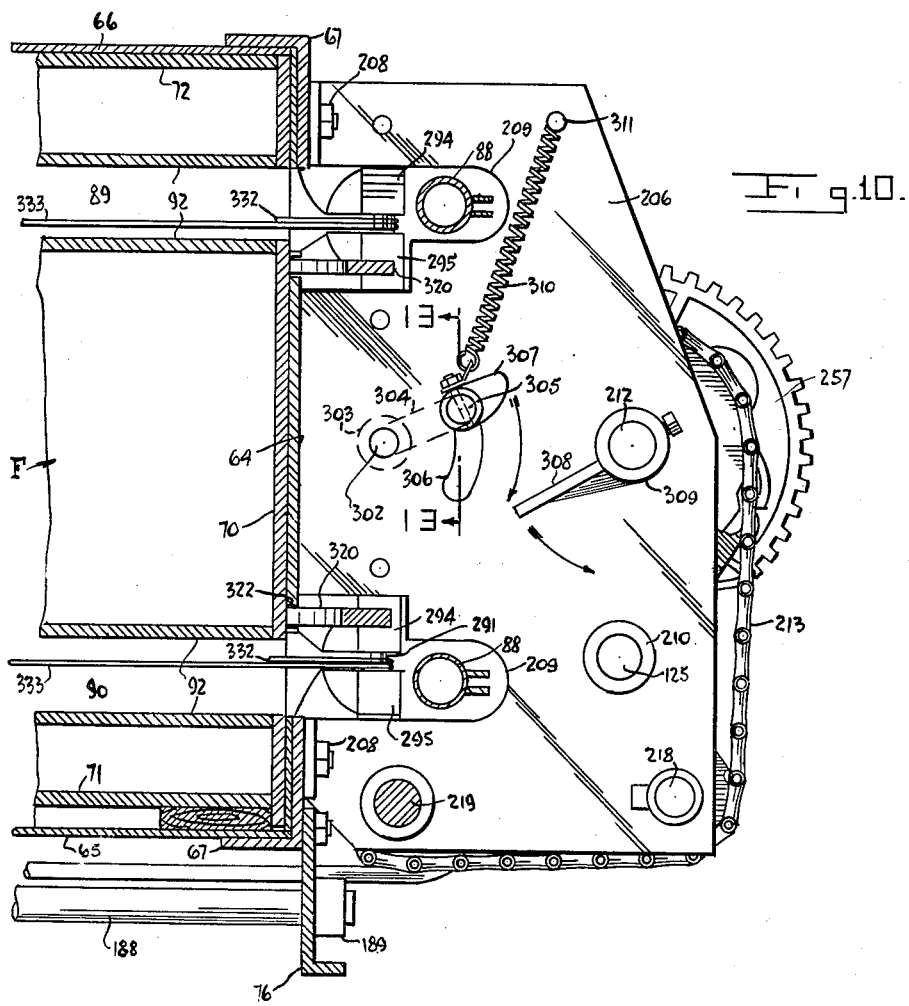
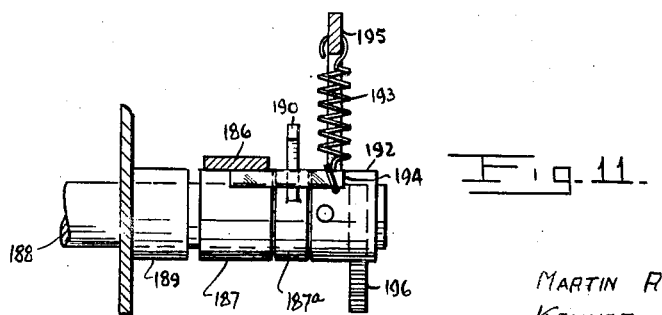
Inventors
MARTIN RONNING
KENNETH M. KEITH
By Carlsen + Hazle
Attorneys Inventors
MARTIN RONNING
KENNETH M. KEITH
By Carlsen & Hayle
Attorneys

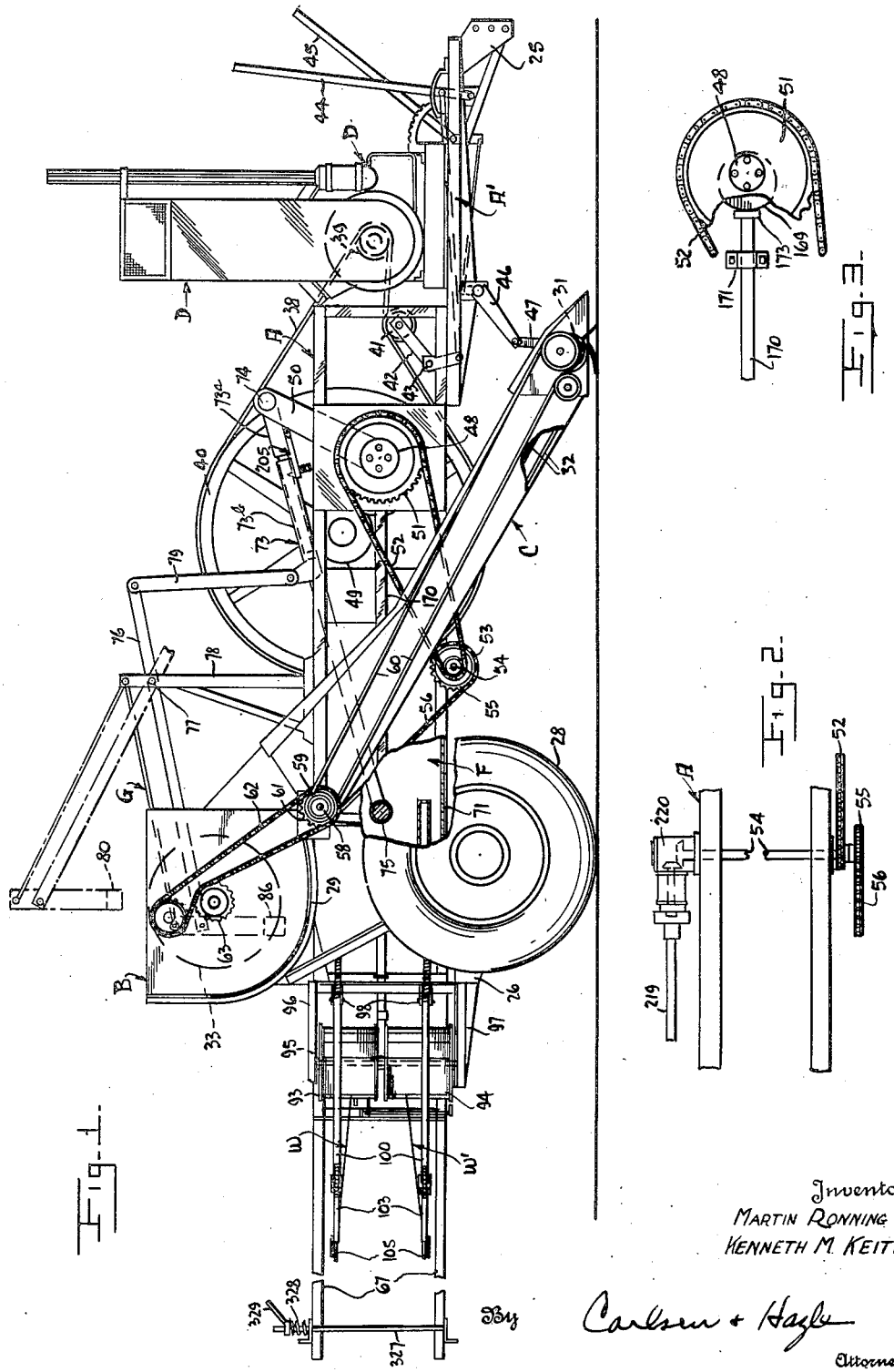

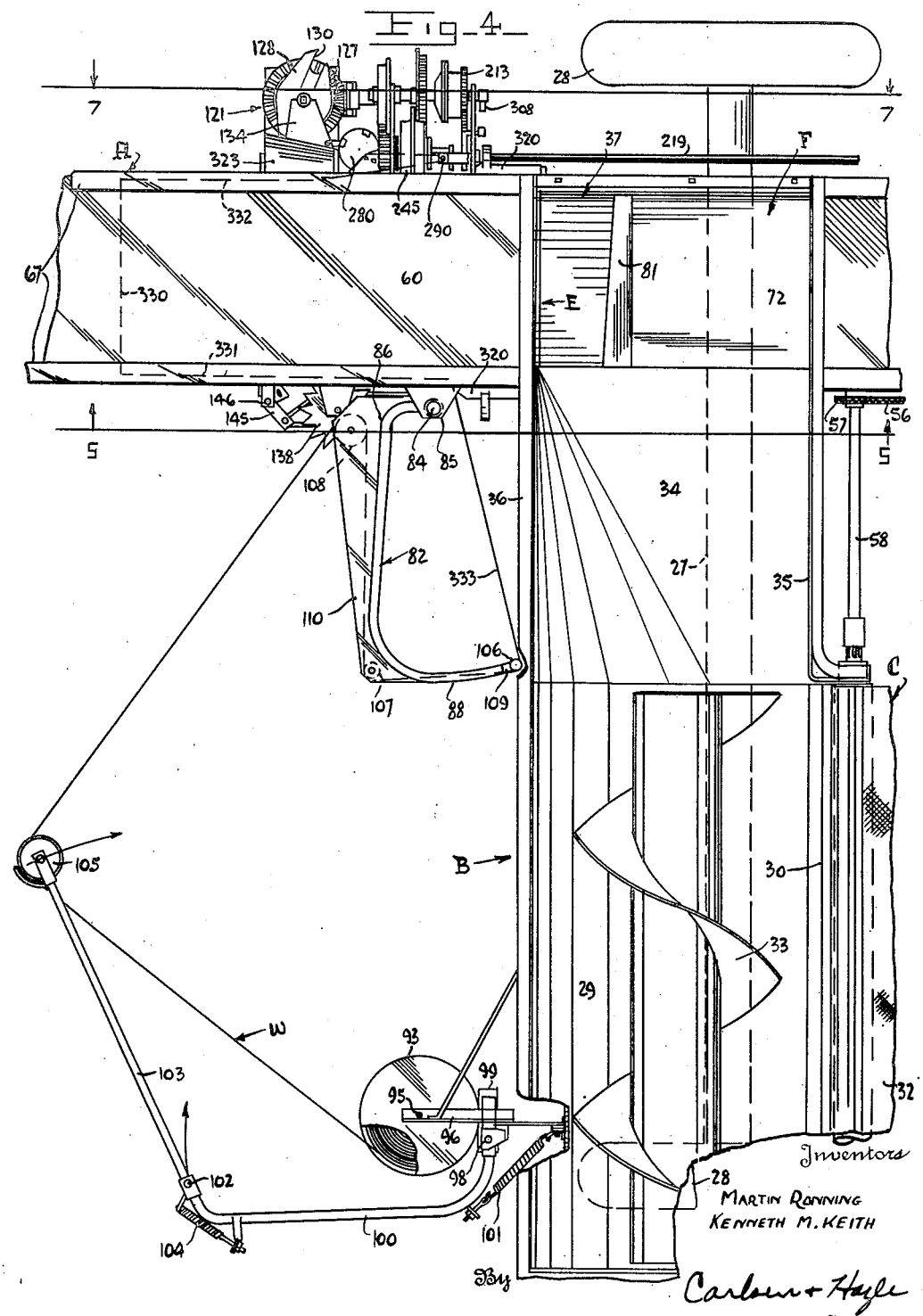

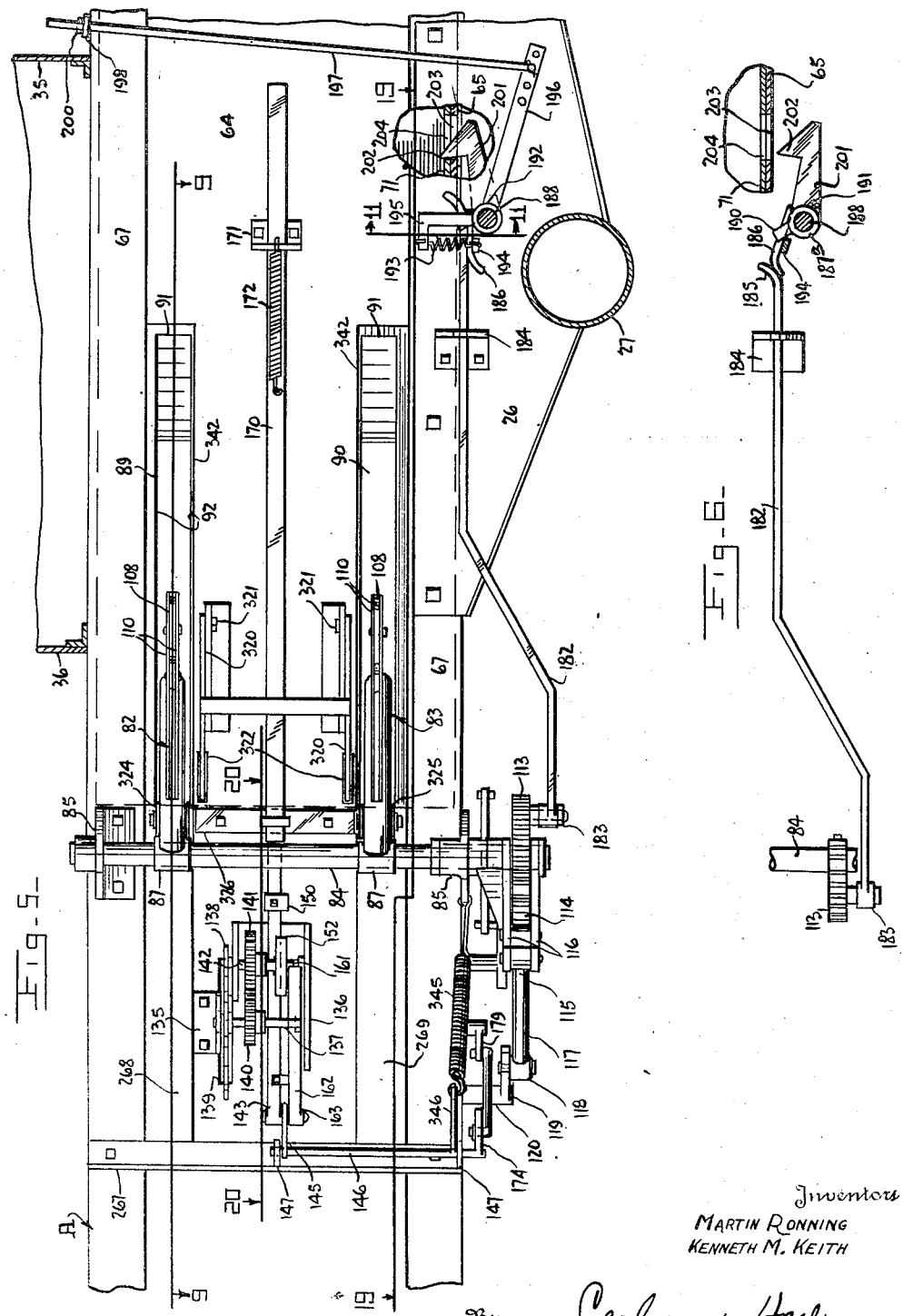

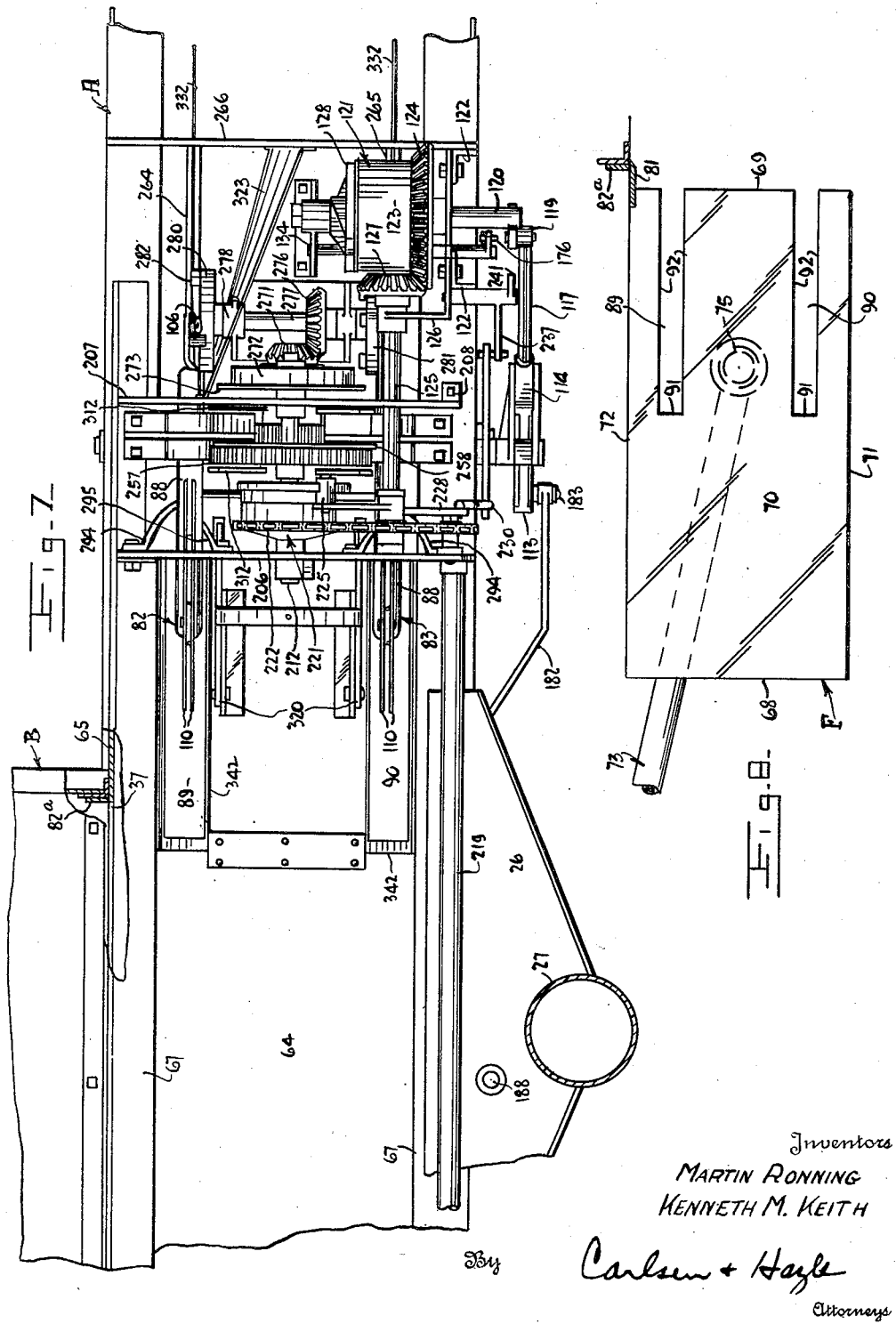

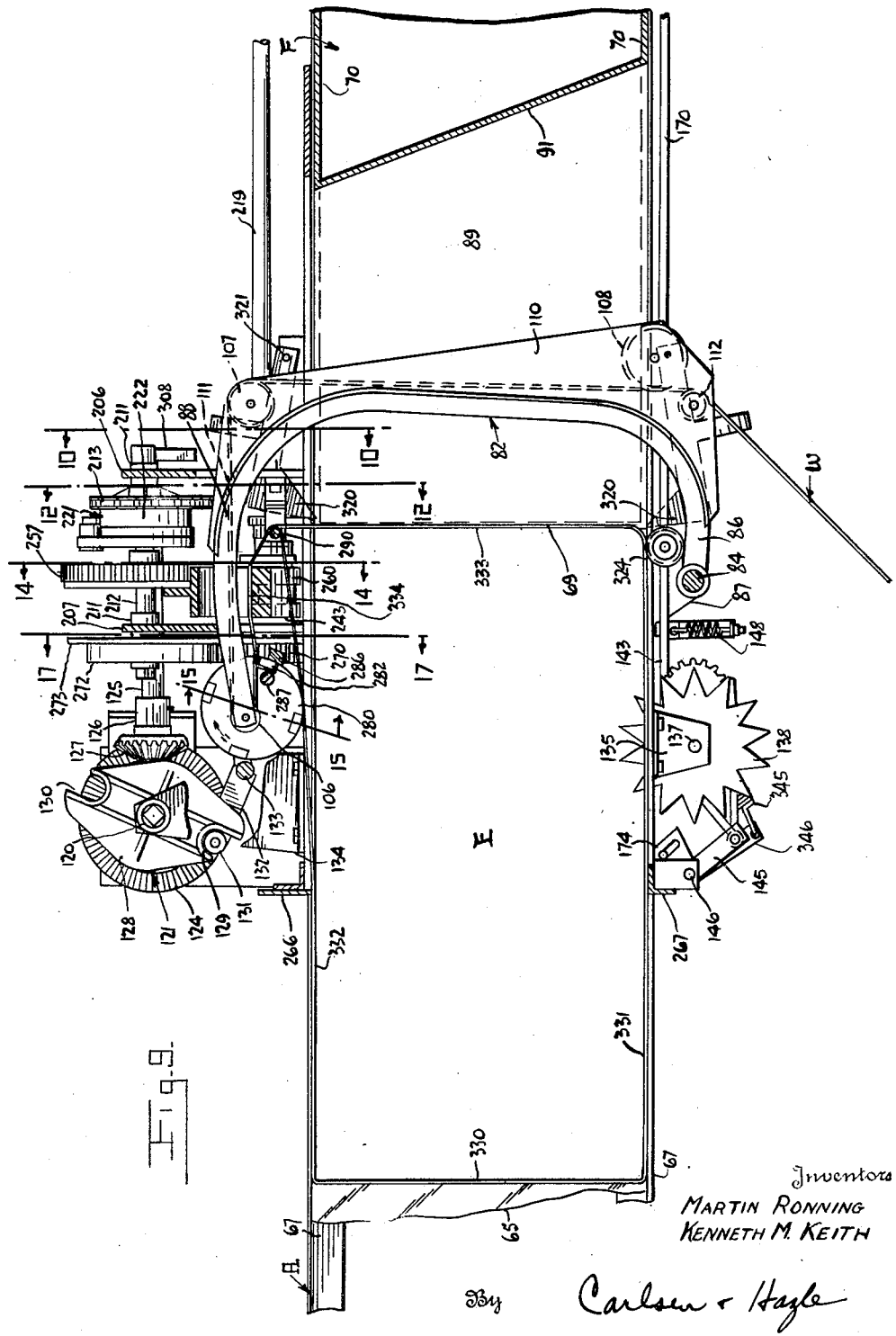

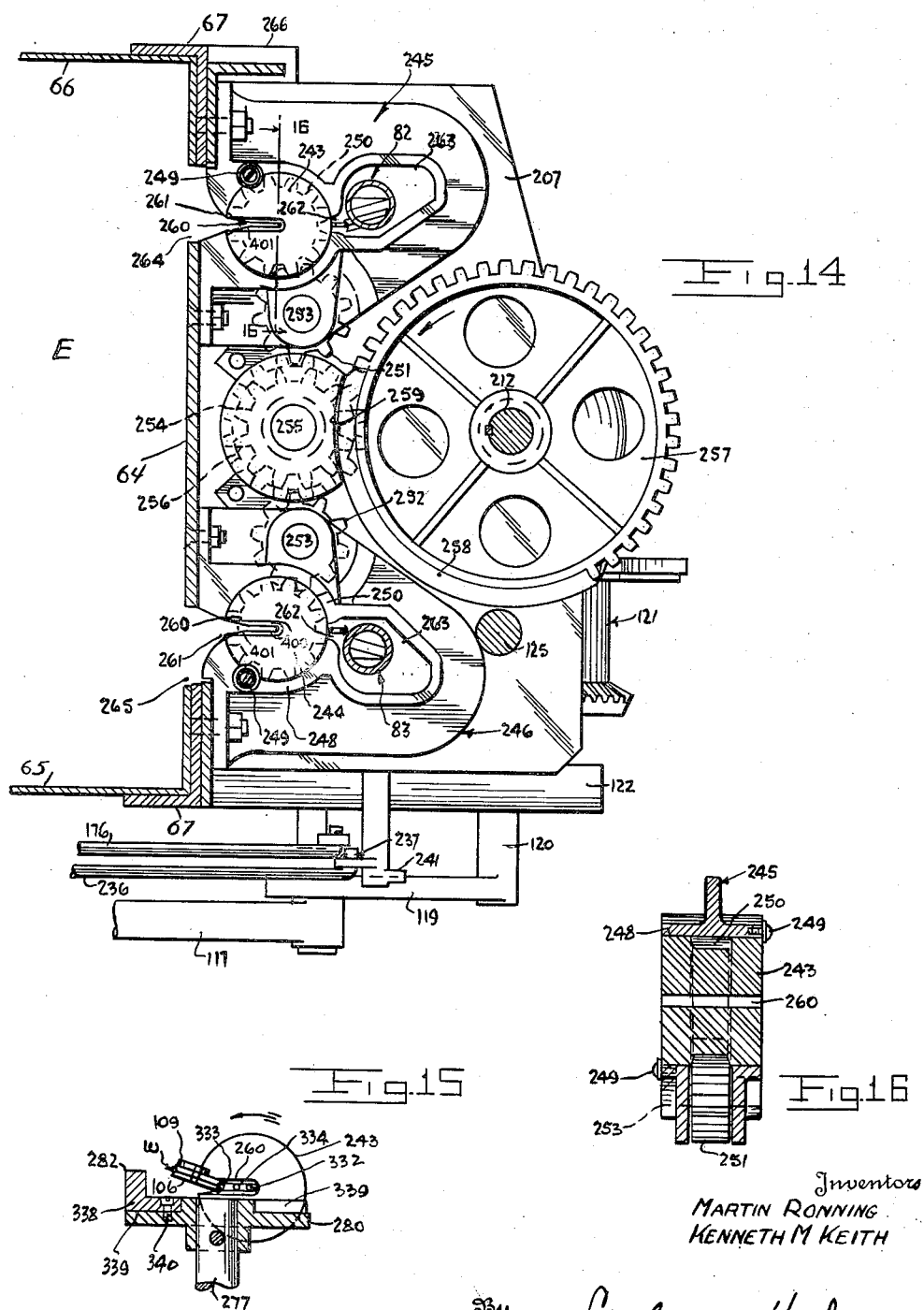

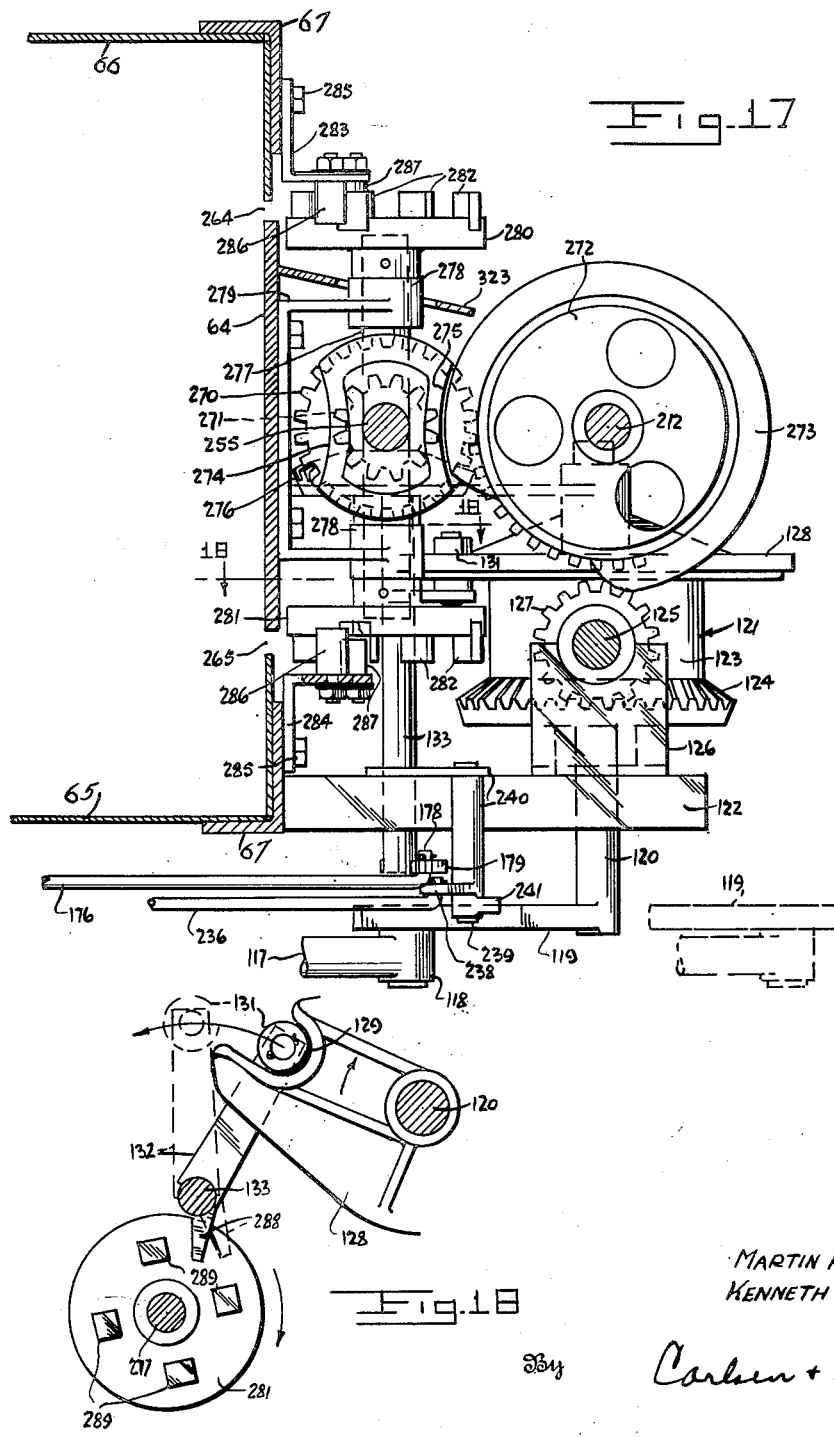

April 10, 1951 M. RONNING ET AL 2,548,559
BALING MACHINE
Filed April 13, 1944 12 Sheets-Sheet 10
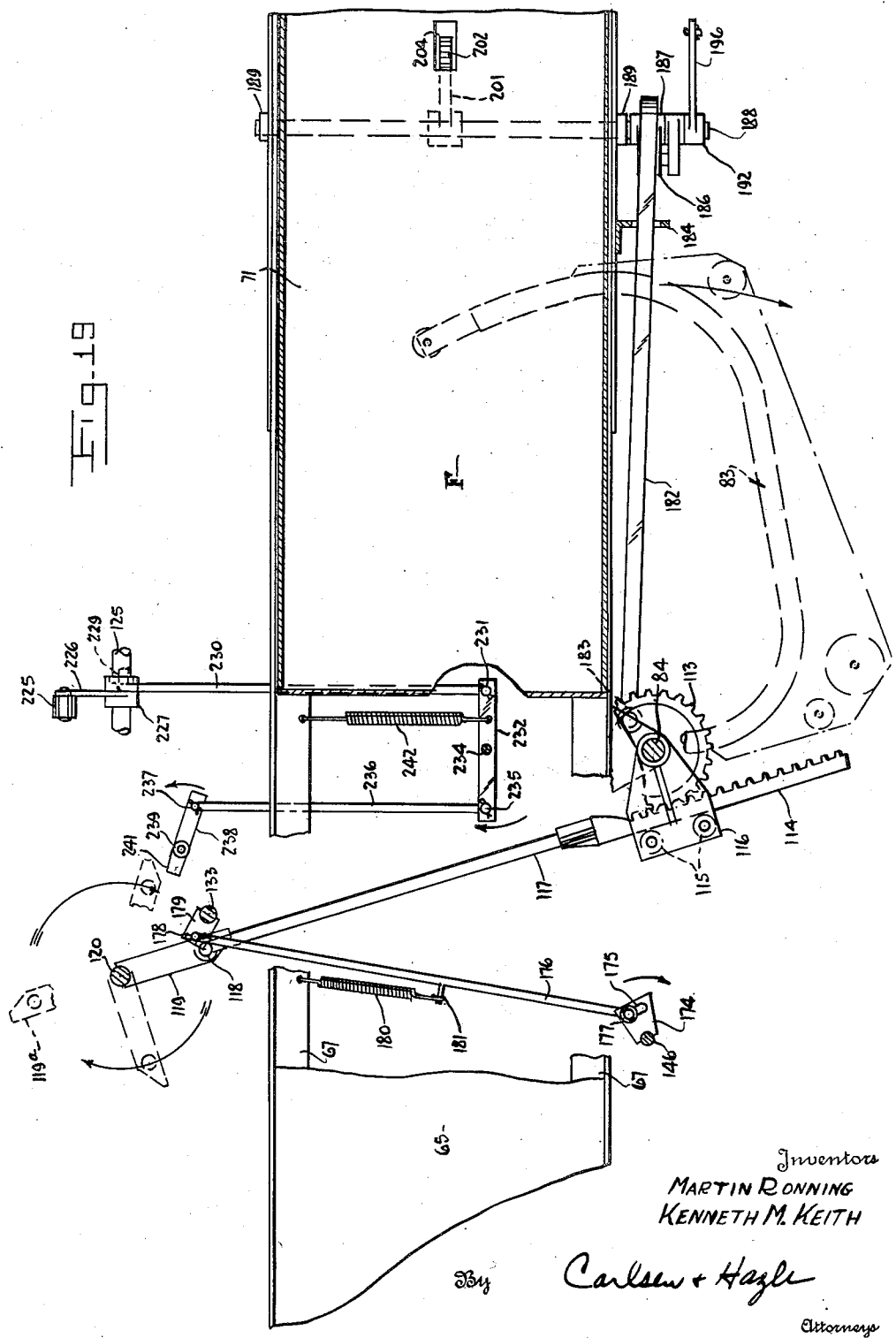
Inventors
MARTIN RONNING
KENNETH M. KEITH
By Carlsen + Hazle
Attorneys

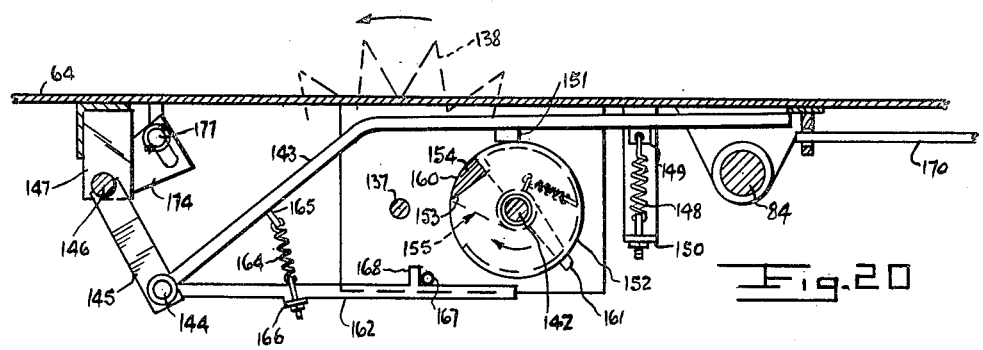
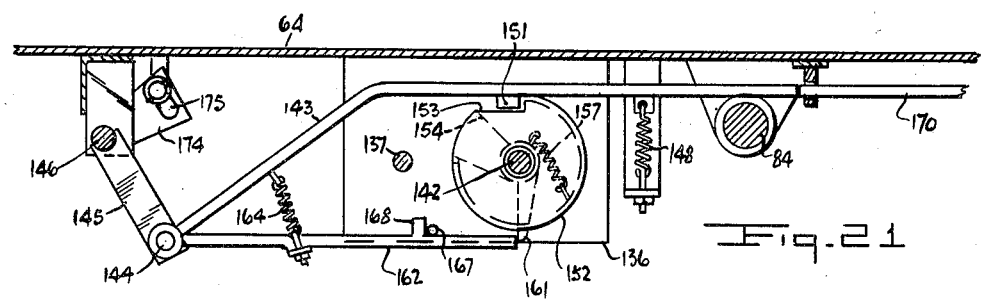
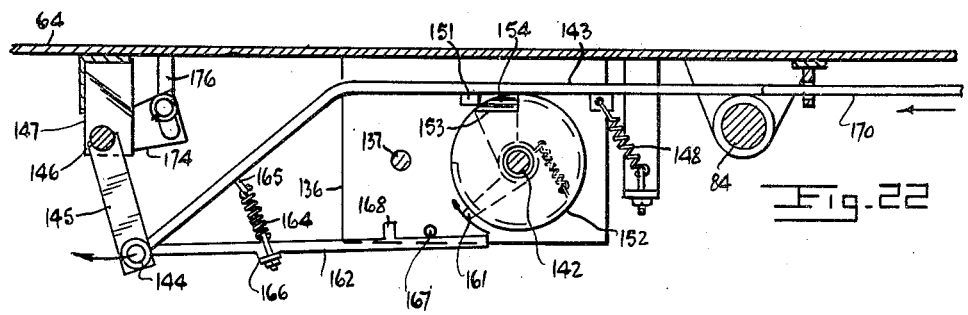
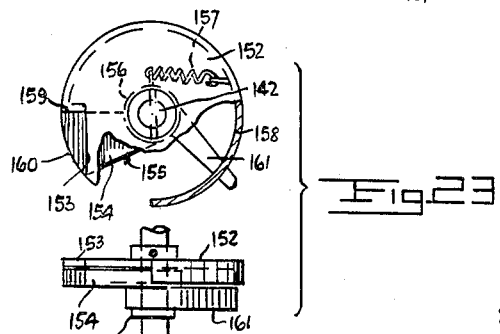

Patented Apr. 10, 1951

2,548,559

UNITED STATES PATENT OFFICE 2,548,559

BALING MACHINE

Martin Ronning, St. Louis Park, and Kenneth M. Keith, Minneapolis, Minn., assignors to Minneapolis-Moline Company, Hopkins, Minn., a corporation of Minnesota Application April 13, 1944, Serial No. 530,796

29 Claims. (Cl. 100—20)

This invention relates to baling machines for baling hay, straw and similar materials from the fields.

The primary object of the invention is to provide a continuous process baler in the form of a traveling machine adapted to be drawn over the field by a tractor and functioning to pick up the hay or straw from the field, compress the material into bales and tie them with wire, all of these operations being carried out automatically so that the only attendant required is the driver of the tractor. Most machines of this kind to our knowledge, and all of them using wire for tying the bales, have required the attendance of one or more additional operators for manually tying the bales. In our machine, however, the tying operation is wholly automatic and therefore may be carried out faster than the manual operation and with less likelihood of interruption of the continuous operation of the machine.

In the operation of a wholly automatic machine of this nature it is necessary that a number of separate operations take place in properly timed sequence and it is a further object of our invention to provide mechanism by which this is accomplished in a practical and positive manner, and by a mechanism having the durability and simplicity required of a machine for farm operation.

Another object is to provide a tying mechanism for a hay or straw baler which is completely automatic in its operation, which permits the use of wire for tying the bales with the resulting advantages of wire as regards strength and durability as contrasted with such materials as binder twine used in other tying mechanisms, and which operates to connect the ends of the wires encircling the bales rapidly and positively as each bale is completed.

These and other more detailed and specific objects will be disclosed in the course of the following specification, reference being had to the accompanying drawings, in which—

Fig. 1 is a side elevation of a baling machine constructed in accordance with our invention, and with parts thereof broken away to disclose interior construction.

Fig. 2 is a fragmentary plan view of a lower portion of the frame of the baler illustrating the drive for the tying mechanism.

Fig. 3 is an enlarged fragmentary side elevation of the main drive sprocket as seen in Fig. 1, showing the actuating eccentric therein.

Fig. 4 is an enlarged plan view of a central portion of the machine.

Fig. 5 is a further enlarged upright, longitudinal sectional view taken along the line 5—5 in Fig. 4.

Fig. 6 is a fragmentary side view of the plunger stopping or locking mechanism of Fig. 5, showing the same in unlocked or inoperative condition as contrasted to the operative condition illustrated in Fig. 5.

Fig. 7 is a side elevation, partially in section and taken substantially along the line 7—7 in Fig. 4.

Fig. 8 is a side elevation of the baling plunger alone but showing in section the cooperating means for shearing the hay at each working stroke of the plunger.

Fig. 9 is a horizontal sectional view along the line 9—9 in Fig. 5.

Fig. 10 is an enlarged, fragmentary, vertical cross section along the line 10—10 in Fig. 9.

Fig. 11 is an enlarged fragmentary sectional detail view along the line 11—11 in Fig. 5.

Fig. 14 is an enlarged cross section along the line 14—14 in Fig. 9.

Fig. 15 is an enlarged fragmentary sectional detail view along the line 15—15 in Fig. 9.

Fig. 16 is a fragmentary sectional detail view along the line 16—16 in Fig. 14.

Fig. 17 is an enlarged cross section along the line 17—17 in Fig. 9.

Fig. 18 is a fragmentary horizontal sectional view along the line 18—18 in Fig. 17.

Fig. 19 is a horizontal sectional view taken substantially along the line 19—19 in Fig. 5.

Fig. 20 is an enlarged fragmentary horizontal sectional view along the line 20—20 in Fig. 5 showing the bale metering mechanism at one stage of its operation.

Figs. 21 and 22 are similar views but showing the mechanism in successive stages of its operation.

Fig. 23 is an enlarged composite plan and side elevational showing of the actuating part of the bale metering mechanism.

Figure 12:
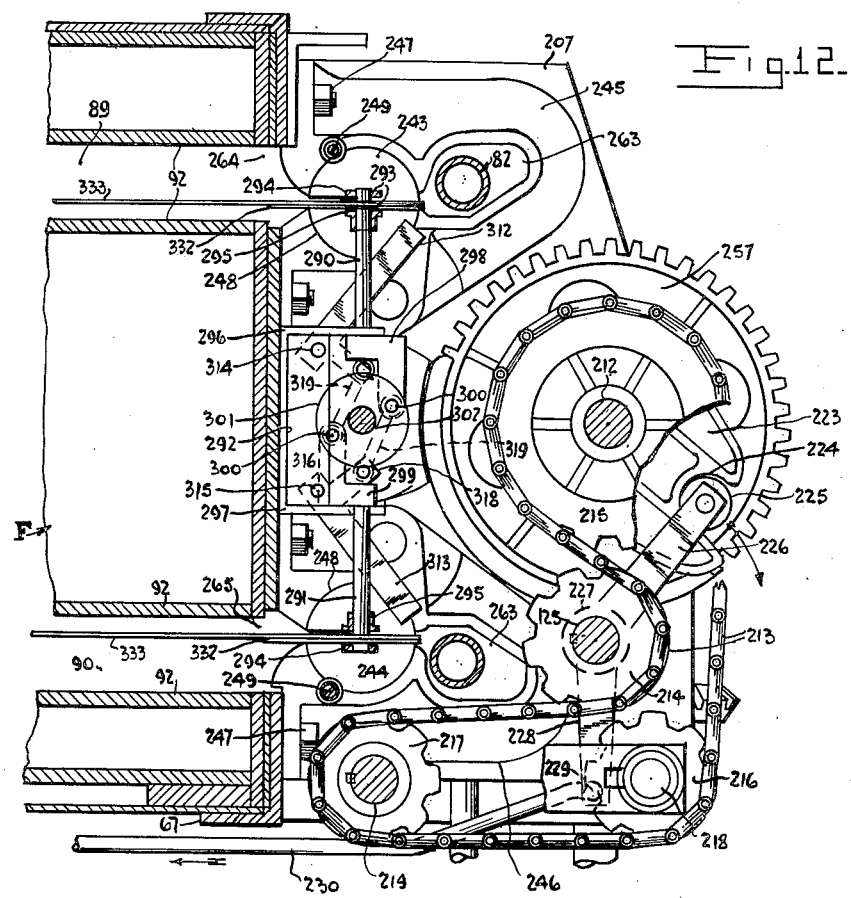
Fig. 12 is an enlarged cross section along the line 12—12 in Fig. 9.

Our machine is particularly intended for the baling, in the field, of such fibrous fodder materials as hay, straw and the like but for sake of brevity hereinafter the material will be referred to simply as hay.

Referring now more particularly and by reference characters to the drawings, our machine is seen to comprise a main, longitudinal baling frame A which at a forward end has a hitch 25 by which it may be attached to the drawbar of a tractor (neither shown) and which intermediate its ends is supported by bracket plates 26 upon an axle 27 carried by widespread ground wheels 28. Also supported in the frame A and over one wheel 28 is a laterally extending and upwardly located feed mechanism B comprising a platform or trough 29 having an outer portion of its forward edge open at 30. From this open forward edge is supported a forwardly and downwardly angled pick-up mechanism C which is generally conventional in construction and includes a forwardly located pick-up cylinder 31 designed to gather the hay from the field and deliver it to an upwardly and rearwardly moving conveyor canvas 32. The conveyor canvas then delivers the hay onto the platform 29 and the hay is urged laterally and inwardly therealong by a feed auger 33. The operation of this auger 33 urges the hay into an inner section 34 of the feed platform or trough 29 which is closed at front and rear by walls 35—36 and which acts as an accumulating chamber wherein the hay may accumulate prior to being fed downwardly from the extreme end of the platform through a feed opening 37 located in the upper side of the frame A.

For convenience sake right and left hand sides of the machine, as it is illustrated herein, will be referred to and in such designation is understood that right and left is determined by looking forwardly at the machine. The feed mechanism B is thus shown in the right hand side of the machine. Obviously the parts could be reversed if desired.

Power for operating the feeding elements just described, as well as all other parts, of the baler, is preferably supplied by a separate power plant located on the machine and we have shown for this purpose an engine D supported upon a foreward extension A' of the main frame A. A belt 38 runs over a drive pulley 39 on the engine D and over a large flywheel and pulley 40 to drive the latter, the belt being tightened by a pulley 41 swingably supported upon an arm 42 pivoted at 43. The arm 42 is adjusted to tighten the belt, or loosen it when the baler is not operating, by means of a hand lever 44 in any suitable manner. The only other adjustment required is provided by another hand lever 45 which raises and lowers an arm 46 connected by a link 47 to the forward end of the pick-up mechanism C to raise and lower the same in a conventional manner. Both hand levers 44 and 45 are located convenient to the operator of the tractor as will be apparent.

The flywheel 40 operates a crankshaft 48 through a gear reduction box 49 and on this crankshaft is located a crank 50.

The right hand end of the crankshaft 48 also carries a rigidly mounted main drive sprocket gear 51 over which is trained a sprocket chain 52 leading rearwardly to a sprocket gear 53 on a countershaft 54 journaled crosswise beneath the frame A. Another sprocket gear 55 on the countershaft 54 operates a sprocket chain 56 running over a sprocket gear 57 on a shaft 58 (Figs. 1 and 2) which runs laterally to and drives the conveyor canvas 32. This shaft 58 also, at its outer end, carries a belt pulley 59 driving a belt 60 running downwardly and forwardly to operate the pick-up cylinder 31, and a sprocket gear 61 which operates a sprocket chain 62 running over a gear 63 on the outer end of the conveyor auger 33. The engine D is thus seen to operate all of the hay pick-up and feed parts of the machine.

The frame A includes a bale case which forms a baling chamber designated generally at E and which case comprises side walls 64, a bottom 65, and top 66, the chamber being open forwardly and rearwardly and being generally rectangular in shape. The frame A has as its main members four angles 67 disposed at the corners of this rectangle and these angles extend rearwardly of the baling chamber, per se, a considerable distance as indicated in Fig. 1. The bottom 65 and top 66 extend this full length rearwardly whereas the sides 64 terminate a short distance to the rear of the baling chamber wherein the bale is accumulated and pressed. The feed opening 37 is, of course, formed in the top 66 of the chamber.

A baling plunger F operates in the baling chamber E and comprises a substantially rectangular box-like member having an open forward end 68, a closed rear end or head 69, and sides 70, bottom 71 and top 72. The shape and size of the plunger F is such that it will nicely fit within the baling chamber E and may be reciprocated freely therein. For the latter purpose a pitman or connecting rod 73 is provided and at its forward end it is pivoted at 74 to the aforesaid crank 50, and is pivotally connected at its rear end to a pin 75 carried by the plunger. Obviously when thus arranged the plunger F will be reciprocated forwardly and rearwardly in the baling chamber by the crank 50 as it is revolved by the engine D. In this operation the plunger alternately moves forwardly of the feed opening 37 so that hay may be fed down into the chamber E and then moves rearwardly beneath and past this opening to compress this hay. For convenience in description the rearward movement of the plunger is called the advance or compression stroke, while the forward movement is referred to as the return stroke.

To urge the hay downwardly through the feed opening 37 behind the plunger at each return stroke thereof a packer mechanism G is provided comprising an arm 76 (Fig. 1) fulcrumed at 77 atop a tower 78 on the frame A and connected at its forward end by a link 79 to the pitman 73. At its rear end the arm 76 carries a packer head 80 and the arrangement, largely conventional, is such that, as the plunger F moves forwardly on its return stroke, the packer head 80 will move downwardly toward and into the feed opening 37 forcing the hay down into the baling chamber. As the plunger F starts rearwardly the packer head will move upwardly into the clear, as seen in Fig. 1, and while the plunger goes through its compression stroke the feed opening 37 will be closed by the plunger top 72 so that hay will accumulate in the accumulating chamber 34 ready for the next charging operation.

The effect of the periodic downward charging movement of the packer head 80 is to feed the hay down into the baling chamber in folds and as the plunger F moves on its compression stroke each fold is severed from any hay left above the feed opening by means of a cutter blade 81 (Figs. 4 and 8) which is carried by the upper rear edge of the plunger and cooperates in shearing relation with a shear bar 82ᵃ at the rear edge of the feed opening 37. Each fold of hay is thus cleanly separated from the next to facilitate use of the bales and to prevent any connection between successive bales as they are pressed and delivered from the machine.

As the hay is pressed by the plunger F it moves rearwardly in the baling chamber E and when of a desired and predetermined length each bale is tied so that it will retain its compacted shape when delivered from the machine. The mechanism for measuring, or metering, and tying the bales will now be described.

The bales are each tied with a pair of wires which pass around the sides and ends of the bale and of which the individual wires are vertically spaced from each other and from the top and bottom of each bale. At the level, then, of these two wires and in the right hand side of the machine needles, designated generally at 82 and 83, are provided, these needles being supported alongside the baling chamber and adjacent its rear portion upon an upright needle shaft 84 whereon the needles are secured in vertically spaced relation. The needle shaft 84 is journaled in bearing brackets 85 affixed to the frame A, or to the corner angles 67 thereof, and in operation is rotated back and forth through a part of one revolution to impart horizontal swinging movements to the needles. The manner in which the shaft is thus operated will be presently made clear.

The needles 82 and 83 are each generally U-shaped or bowed in form, being made of a tubular member having a mounting end 86 carrying a collar 87 to fasten to the shaft 84 and a curved operating end 88. Normally the needles stand in the position shown in Fig. 4, extending outward from the frame and with the belly or hollow of their bowed shape disposed forwardly. The shaft 84 is located at a point slightly to the rear (Fig. 9) of the head of the plunger F in its extreme rearward position. In operation the needles are swung forwardly and inwardly so that they traverse the frame A and bring these operating ends 88 alongside the left hand side of the frame A opposite the shaft 84 as seen in Fig. 9.

This swinging movement of the needles takes place while the plunger F is at the extremity of its compression stroke and to clear the needles the plunger is provided with vertically spaced slots 89 and 90 formed through its sides 70 and of such length and width as to provide adequate clearance space for the passage of the needles. The slots 89 and 90 are closed at forward ends 91 and upper and lower sides 92 by suitable wall or plate members but open for their full width through the head end 69 of the plunger as best shown in Fig. 8. The sides 64 of the bale chamber have slots 342 which register with the slots 89 and 90 and clear the needles.

The wire for tying the bales is taken from two spools on which the wire is coiled and separate strands are led off from each spool through the needles 82 and 83 for forming the respective upper and lower ties for the bales. These spools are designated at 93 and 94 (Figs. 1 and 4) and are supported adjacent the outer end of the feed platform B upon an upright shaft 95. The shaft 95 is carried in upper and lower brackets 96 and 97 and the spools are journaled on the shaft in super-imposed relation so that the wires may be pulled off horizontally, to feed the needles. Pivoted at 98 adjacent the spools 93 and 94 are brake shoes 99, one for each spool, and these shoes are secured to the ends of generally rearwardly directed arms 100, with springs 101 connected between the arms and the brackets 96 and 97 to normally and yieldably urge the brake shoes against the rims of the adjacent spools. Pivoted at 102 to the rear ends of the arms 100 are elongated rear arms 103 which angle rearwardly and inwardly toward the baler frame A and which are normally urged outwardly to about the position indicated in Fig. 4 by springs 104. The extremities of these rear arms 103 carry grooved sheaves or pulleys 105 and the wires, designated generally at W and W¹ are led off from the respective spools 93 and 94 in a rearward and inward direction around these pulleys 105 and thence inwardly and forwardly toward the needles.

Each needle 82 and 83 carries at the extremity of its operating end 88 a pulley 106, another pulley 107 near the junction of this end 88 with the main portion or back of the needle, and a third pulley 108 near the end 86. The first pulley 106 is journaled on a short finger 109 welded or otherwise secured to the extremity of the end 88 while the other pulleys 107 and 108 are journaled as shown between upper and lower, spaced flanges 110 formed by suitably shaped plates welded to the needles. The arrangement is such that the wires W and W¹ coming from the pulleys 105 may be threaded around the pulleys 108, passed freely between the flanges 110 and around the pulleys 107 and then passed inwardly into the tubular operating end 88 through suitably located openings 111 (Fig. 9) in the walls thereof and finally extended outward from the ends of the needles and passed around the pulleys 106. A fourth, smaller pulley 112 is provided alongside each of the pulleys 108 to hold the wire in engagement therewith as the needles swing about as clearly appears in Fig. 9. From the pulleys 106 the wire W and W¹ are led into the machine as will presently appear.

The arms 100 and 103 serve to prevent the spools 93 and 94 from overrunning and tangling the wire as the needles 82 and 83 swing in and out of the machine. Thus as the needles swing from the position shown in Fig. 4 inwardly into the machine, as seen in Fig. 9, there is first a loosening of the wires W and W¹ and then a tightening and sharp jerk thereon, followed by a continued pull requiring wire to be drawn off the spools. The springs 104 normally bias the rear arms 103 outwardly and rearwardly and hold the wires taut, as well as take up any slack as it develops and compensates for jerks on the wires. As a pull on the wire occurs, due to the needles swinging inward, tension of the springs 104 will gradually increase to the point that the arms 100 will be swung inwardly against the tension of the other springs 101. This action will then release the brake shoes 99 permitting the spools to turn and feed the wire to the machine, while maintaining control on the spool speed to prevent overrunning, as will be evident.

The needles 82 and 83 are swung or oscillated through approximately 180 degrees by means of a gear sector 113 secured to the lower end of the needle shaft 84, below the level of the frame A, with which sector cooperates an operating gear rack 114. These parts are best shown in Figs. 5, 6, and 19. The rack 114 is held in mesh with the gear sector 113 by means of rollers 115 engaging the rear side of the rack and permitting it to reciprocate tangentially with respect to the gear, these rollers being carried between vertically spaced plates 116 pivotally attached to the needle shaft 84. The rack 114 is operated by an arm 117 which extends across and beneath the frame A and is pivotally connected at its end at 118 near the end of a crank 119 secured to an upright shaft 120 carried at the left hand side of the machine. It will be evident that a complete revolution of the crank 119 will first swing the needles from normal, outwardly extending positions (Fig. 4) inwardly across the bale chamber to operative or tying positions (Fig. 9) and then back to starting positions.

The shaft 120 is operated under control of a needle clutch designated generally at 121 located on the left hand side of the frame over a base frame comprising a pair of laterally projecting angles 122 (Figs. 7 and 17), this clutch having a driven part or drum 123 loose on the shaft and carrying a bevel gear 124. A shaft 125 is supported at one end in a bearing bracket 126 affixed to the angles 122 and carries a bevel pinion 127 meshing with the gear 124 to drive the drum in one direction continuously. The further support of, and driving means for, the shaft 125 will presently be described. The clutch 121 further includes an upper plate 128 secured to shaft 120 and having two diametrically opposed notches 129 and 130 (Fig. 9). A stop roller 131 is carried by an arm 132 secured to an upright shaft 133 so that the roller may engage either of the notches 129 or 130 and lock the clutch against rotation. When this roller is moved out of the notches clutch means within the drum 123 is engaged to connect the drum to the plate 128 and cause rotation of the latter and the shaft 120, but as the plate 128 rotates the roller 131 rides its edge so that it will drop ino the next notch as it comes about and again disengage the clutch while locking the shaft 120. One half revolution only of these parts is then permitted each time the roller 131 is swung outward and the direction of the resulting rotation of the shaft 120 and crank 119 is indicated by the arrow in Fig. 19.

The clutch 121 is conventional in construction and it is believed therefore that detailed illustration of its internal construction is not necessary herein. A similar clutch is shown in United States Patent No. 2,329,193 issued September 14, 1943.

Above the clutch 121 the shaft 120 is journaled in and braced by a bearing bracket 134 secured to the adjacent side of the frame A as seen in Fig. 7.

The first one-half revolution of the shaft 120 by the clutch 121, corresponding to a movement of the crank 119 from the dotted line position 119ª (Fig. 19) to the full line position therein, is initiated or brought about when a bale is pressed and accumulated in the baling chamber E by bale metering means soon to be described. This movement of the crank 119 is understood to swing the needles 82 and 83 through their working stroke or inward movement.

On the right hand side of the frame A upper and lower vertically spaced and outwardly extending brackets 135—136 (Fig. 5) are provided and between these is journaled an upright shaft 137 whereon is mounted a star wheel or toothed disk 138. A slot 139 in the adjacent side 64 of the frame permits an edge portion of the star wheel 138 to project into the baling chamber E and to be rotated by the rearward travel movement therein of a bale of hay as it is accumulated. Thus as the bale is pressed and moved rearwardly by action of the plunger F, the shaft 137 will be rotated in the direction of the arrow in Fig. 20. The shaft 137 carries a gear 140 which meshes with a gear 141 upon a parallel shaft 142 journaled in the bracket structure referred to above. The shaft 142 is of course thus rotated in an opposite direction by the accumulation of the bales.

Referring more specifically to Figs. 5 and 20 through 23, we show therein an actuating or push bar 143 which at one end 144 is pivotally connected to an arm 145 secured to and radially extending from the upper end of an upright rock shaft 146. The shaft 146 is journaled alongside the frame A in bearings 147 and is located rearwardly of the star wheel 138. From this pivoted end 144 the push bar 143 angles first inwardly and then forwardly, inside of the shafts 137 and 142 to a point just forward and inwardly of the needle shaft 84. A retractile coil spring 148 is stretched between a lug 149 on the push bar and a bracket 150 on the frame side to normally bias the bar in an outward direction with respect to the frame. At a point substantially in alignment with the shaft 142 the bar 143 has an outwardly extending lug 151 and the tension of the spring 148 causes this lug to normally ride the peripheral surface of a disk 152 secured to and rotatable with said shaft. The outward movement of the bar under influence of the spring is thus limited. The disk 152 has a notch 153 in its margin and normally registering with this notch is a wing 154 of a valve or stop member 155 which has a hub 156 by which it is journaled on the shaft 142 beneath the disk 152. A spring 157 is connected between the hub 156 and a depending flange 158 on the disk 152 and normally urges the stop member 155 in a clockwise direction, with respect to the disk, as viewed in Figs. 20–22, so that the wing 154 abuts the edge 159 of the notch 153 and closes or covers this notch. The lug 151 is arranged to ride the margin of the disk 152 and the arcuate edge 160 of the wing 154 and with the wing in this position obviously the lug cannot enter the notch 153. This is the condition illustrated in Figs. 20, 22, and 23.

Extending from the hub 156 of the stop member 155 is a finger 161 which projects beyond the margin of the disk 152. Disposed in the path of this finger 161 is a stop bar 162 which is pivoted at its rear end at 163 (Fig. 5) to the arm 145 and extends forwardly therefrom toward the outside surface of disk 152. A retractile coil spring 164 is stretched between a lug 165 on the bar 143 and a lug 166 on this stop bar, forward of the pivots for both, and normally biases the stop bar inwardly toward the disk, this movement being limited by the slidable engagement of the bar with a pin 167 on the lower bracket 136. The stop bar 162 further carries a lug 168 adapted to engage the pin 167 (Figs. 20 and 21) to limit forward movement of the bar which occurs in response to a spring bias present on the shaft 146 exerted by a spring 345 stretched between an arm 346 on the shaft and the bracket 85, as seen in Fig. 5.

The crankshaft 48, as seen in Fig. 3, carries an eccentric 169 on the right hand side of the machine and cooperating therewith is a slide bar 170 which is slidably mounted lengthwise along this side of the machine and extends from the eccentric rearwardly to a point immediately adjacent the forward end of the actuating bar 143. The slide bar 170 is slidably supported in brackets 171 on the side of the frame A and is normally pulled in a forward direction therealong by a spring 172 (Fig. 5) so that its forward end, having a shoe 173, will ride the margin of the eccentric 169. It will be apparent, therefore, that the rotation of the crankshaft 48 will continuously reciprocate the slide bar in forward and rearward directions and further that the rearward movement of the bar will coincide with, or be synchronized with the rearward compression stroke of the baling plunger F.

In the normal position of the parts just described the actuating bar 143 stands inwardly with respect to the path of the slide bar 170 (Fig. 20) and will be retained in this position by the engagement of the lug 151 with the edge of disk 152. As the bale accumulates, however, the rotation of the star wheel 138 will gradually rotate the disk 152 until the finger 161 abuts the end of the stop bar 162 (Fig. 21) whereupon the continuation of such rotation of the disk will cause the notch 153 (which now comes opposite the lug 151) to be gradually opened by its advance past the now locked wing 154. Immediately as this occurs the lug 151 will drop into the notch 153 and the bar 143 will come into alignment at its forward end with the slide bar 170. The next rearward movement of the latter will then push the bar 143 sharply rearward (Fig. 22) causing an oscillating movement to be imparted to the shaft 146 as indicated by the arrow. The same movement carries the stop bar 162 rearward, since it is pivoted to arm 145, and the finger 161 then clears the end of the bar 162 whereupon the spring 157 is permitted to oscillate the wing 154 back into place closing the notch 154. The lug 151 is clear of the notch as this occurs, due to the rearward movement of the bar 143, and as this bar then moves forward again the lug will ride upon the arcuate edge 160 of the wing, again swinging the forward end of the bar inwardly out of the path of slide bar 170. It is thus evident that a complete revolution of the disk 152, brought about by the accumulation of a bale of predetermined length, will cause one sharp oscillating movement to be imparted to the shaft 146, following which the parts return to normal positions for the next operation.

The aforesaid movement of shaft 146 is caused to engage the needle clutch 121 by the connection to the shaft, below the frame A, of a short lever arm 174 (Figs. 5, 19–22) in a slot 175 in which one end of an actuating rod 176 is hooked as designated at 177. This rod 176 extends to the left beneath the frame and at its other end is hooked at 178 in another short lever arm 179 secured to a lower end of the aforesaid shaft 133. This connection is so made that the movement of the shaft 146 just described will pull upon the rod 176 and oscillate the shaft 133 in such manner as to swing the stop roller 131 out of one notch in the clutch plate 128 whereby the shaft 120 is caused to be rotated by the clutch. The actuating rod 176 is pulled endwise toward the left by a retractile coil spring 180 (Fig. 19) stretched between a lug 181 on the rod and one frame angle 67 and this spring opposes the just described movement causing the stop roller 131 to swing into the next notch as the clutch plate 128 makes a half revolution. The slot 175 permits the required limited independent movement of the actuating rod 176 with respect to lever arm 174, except when the arm pulls upon the rod in response to oscillation of the shaft 146.

With the needles 82 and 83 in their normal position the crank 119 is in the position indicated at 119ᵃ in Fig. 19 and the one-half revolution of the crank brought about by the first engagement of the needle clutch 121 will swing the needles into the machine disposing them in their working positions. As this action takes place, and responsive to the movement of the needles, the plunger F is locked in its rearmost position by mechanism now to be set forth.

Referring to Figs. 5, 6, and 19 particularly, we show therein a latch operating bar 182 which at its rear end is pivoted at 183 to the needle operating sector gear 113 and which extends upwardly and then forwardly therefrom along the right side of the frame A. The forward portion of the bar 182 is slidably mounted through a bracket 184 on the frame and the extremity of the bar forwardly of the bracket is curved upwardly at 185 and adapted to ride over a cam finger 186 carried upon a collar 187. Said collar 187 is loosely mounted on a shaft 188 journaled transversely of the frame in bearings 189 and passing beneath the baling chamber. A collar 187ᵃ is secured by a set screw 191 to the shaft alongside the collar 187 (Fig. 11) and has a finger 190. Another collar 192 is pinned on the shaft 188 outwardly of collar 187ᵃ and normally the collar 187, which is loose on the shaft, is rotated by a spring 193 so that the finger 190 rests against an arm 194 on the cam finger 186. The spring 193 is stretched between the arm 194 and a bracket 195 on the collar 192. An arm 196 is secured to the collar 192 and pivotally connected thereto (Fig. 5) is a rod 197 which passes lossely through a bracket 198 secured to the frame A. The weight of the arm 196 and of this rod normally urges the rod downwardly to oscillate the shaft 188 in a clockwise direction as viewed in Fig. 5. This movement is limited by a stop 200 on the rod. The shaft 188 beneath the bale chamber carries at least one latch 201 having a hook 202 adapted to extend upwardly through an opening 203 in the bottom 65 of the bale chamber and through another opening 204 in the bottom 71 of the plunger F when the latter is in its advanced position.

While the needles 82 and 83 are out of the machine in their normal position the plunger locking parts stand as in Fig. 6, the latch 201 being swung downwardly clear of the openings 203 and 204. Now as the needles swing forward and inward toward working positions the sector gear 113 carries the pivot 183 in a forward direction sliding the bar 182 forwardly and causing its curved end 185 to ride downward upon the cam finger 186, rotating the collar 187 in a counterclockwise direction as viewed in Fig. 5 and stretching the spring 193. The spring 193 then oscillates shaft 188 and swings the latch 201 upwardly through the opening 203 causing it to ride the bottom of the plunger until opening 204 comes into registry with opening 203 as the plunger F reaches its rearmost position. The spring tension provided by the spring 193 then causes the latch to snap upwardly just as the needles reach their working positions. Now the plunger F is locked against return or forward movement and will remain so until the needles swing back to normal positions at which time the rearward movement of the pivot 183 will pull the bar 182 rearward allowing the cam finger 186 to swing upward (Fig. 6) and loosening the spring 193 to allow the latch to swing down into the clear and release the plunger.

As the plunger F is thus latched a strain release connection 205 (Fig. 1) on the connecting rod 73 is operated allowing the rear section 73ᵃ to telescope freely in the tubular forward section 73ᵇ of the rod. In this manner the crank 50 is permitted to revolve continuously while the plunger remains stationary but immediately as the latch 201 clears the plunger the connection will be reestablished causing the connecting rod sections 73ᵃ and 73ᵇ to operate again as a unit and reciprocate the plunger. This arrangement is similar to that shown in Nolt Patent No. 2,236,628 issued April 1, 1941, and no invention therefor, per se, is herein claimed.

Arranged on the left hand side of the frame A in a location for cooperation with the needles 82 and 83 in their working positions is the tying mechanism the details of which will next be set forth.

Front and rear upright supporting plates 206 and 207 (Figs. 7, 9, 10, 12 and 14) are secured, as indicated at 208, to the side 64 of the bale case and have vertically spaced openings 209 adapted to clear the operating ends 80 of the needles 82 and 83 as seen in Fig. 9. These plates 206 and 207 have aligned bearings 210 wherein is journaled the aforesaid shaft 125 for operating the needle clutch 121 and also have aligned bearings 211 at a higher point through which is journaled a tying drive shaft 212, parallel with shaft 125. These shafts 125 and 212 are driven in opposite directions by means of a sprocket chain 213, best seen in Fig. 12, which runs on a sprocket gear 214 secured to shaft 125 and a sprocket gear 215 on shaft 212, the chain being also engaged by an idler 216 and being driven by a drive sprocket gear 217. The idler 216 is carried by a shaft 218 on a lower outer corner of the front plate 206 and the drive gear 217 is secured to the rear end of a drive shaft 219 which is journaled near the inner lower corner of this plate. From this point the drive shaft 219 extends forwardly alongside the bale case (Figs. 2 and 9) and at its forward end is connected through a right angled drive unit 220 to the left hand end of the countershaft 54 so that the power unit D drives both shafts 125 and 212, as will be readily apparent.

The sprocket gear 215 forms a part of a tying clutch 221, being secured to or formed on a drum 222 for the clutch. This clutch 221 is similar to the needle clutch 121 previously described but is adapted, when engaged, to cause the sprocket gear 215 to drive the shaft 212 through one complete revolution. The clutch thus includes a clutch plate 223 having only a single notch 224 for cooperation with a stop roller 225 and when said roller is swung outwardly from the notch the clutch is automatically engaged, the plate 223 moving with shaft 212 through one revolution until the roller again swings into the notch and disengages the clutch. Roller 225 is carried upon an arm 226 extending upwardly and outwardly from a hub 227 which is swingable on the shaft 125. A finger 228 depends from the hub 227 and at its lower end the finger is pivotally connected at 229 to one end of a link rod 230 extending inwardly and toward the right below the bale case. A pull on the rod 230 obviously will swing the arm 226 in an upright plane such as to withdraw the roller 225 from the notch 224, and the actuation of the rod for this purpose is accomplished (Fig. 19) by its connection at its opposite end 231 to one end of an equalizing bar 232 which is fulcrumed at 234 to the underside of the bale case. Connected at 235 to the other end of the bar 232 is a pull rod 236 which extends back to the left beneath the frame and is pivotally connected at 237 to an arm 238. Said arm 238 is secured to a shaft 239 journaled in a bearing bracket 240 on one base angle 122 (Fig. 17) and the shaft 239 further has a trip finger 241 which lies in the path of the needle actuating crank 119. The arrangement is such that, as the crank 119 approaches the position at which it moves the needles 82 and 83 to full working or tying positions, it will engage the trip finger 241 and oscillate the shaft 239 in the direction indicated in Fig. 19. The resulting pull on the rod 236 is translated through equalizing bar 232 to a pull on the rod 230 such as to swing the roller 225 clear of the notch 224. Thus the shaft 212 is set in motion as the needles reach working position. A retractile coil spring 242 stretched between one end of the equalizing bar and the frame angle 67 normally urges roller 225 toward the notch and returns it thereto, as well as restores the entire connected linkage to normal condition, after each complete revolution of the clutch and shaft.

As the needles 82 and 83 approach their tying positions they pass outwardly of and rearwardly past spinners or tying disks 243 and 244, one of which is located adjacent the path of each needle. These spinners, as they will be hereinafter termed, are journaled in upper and lower supporting housings or castings 245 and 246 which are secured as designated at 247 to the side of the bale case and which have bearings 248 receiving the spinners. Screws 249 (Figs. 12 and 16) engage the margins of the spinners to hold them against endwise displacement in said bearings. The spinners 243 and 244 have gear teeth 250 formed around their peripheries and meshing with these teeth, in connection with the respective spinners, are idler gears 251 and 252 (Figs. 14–16) which are journaled upon shafts 253 supported by the castings 245 and 246. The idler gears 251 and 252 are exposed at the lower and upper edges, respectively, of the housings 245 and 246 and meshing with such exposed portions of the gears is a drive gear 254 which is journaled on the forward end of a fixed pin 255 secured to the rear mounting plate 207. Forming a part of the drive gear 254 is a pinion 256 with which is adapted to mesh a tying gear 257 secured to the shaft 212. Only a part of the periphery of the tying gear 257 is toothed as shown, and the number of teeth on the gear, as well as on the pinion 256, gears 251 and 252 and on the spinners 243 and 244, are such that one complete revolution of the tying gear 257, by the tying clutch 221, will rotate the spinners 243 and 244 through a number, for example three, complete revolutions. The untoothed portion of the periphery of tying gear 257 is provided with a flange 258 which engages an arcuate notch 259 in the side of the pinion 256 and thus when the gear is out of mesh with the pinion the latter, and all other gears including the spinners 243 and 244, will be held against movement. The tying gear may, however, turn freely.

The wire spinners 243 and 244 have radially extending notches or slots 260 extending from their centers outwardly through one side, and opening also through their ends. Normally the spinners stand in the positions shown in Fig. 14 with the open sides of the notches 260 disposed inwardly or toward the bale case, and the housings 245 and 246 have inward openings 261 which register with the notches 260 in this position. The housings further have narrow outer openings 262 at diametrically opposed points, with respect to the aforesaid openings 261, so that upon a half turn being imparted to the spinner, the notches 260 will register with these outer openings. Also formed in the housings 245 and 246 outwardly of the spinners are clearance openings 263 through which the needles 82 and 83 may freely pass, and the openings 262 actually are narrow inward continuations of these larger openings 263.

The sides 64 of the bale case adjacent the tying mechanism have longitudinally extending slots 264 and 265 which are aligned or coincide with the horizontal planes through which the needles 82 and 83 swing and with the spinners 243 and 244.

These slots 264 and 265 extend from a forward point substantially coinciding with the head of the plunger F in its rearward position, to a point rearwardly of the needle clutch 121 whereat a frame bar 266 is secured in an upright position on the frame. This bar marks the rear of the bale case side 64 and from this point rearwardly the side of the frame A is open. The same is true on the opposite side of the frame where a similarly located upright angle 267 marks the rear end of the side plate 64. Slots 268 and 269 are also provided in this side in exactly the same locations as the aforesaid slots 264 and 265.

Also embodied in the tying means is a mechanism for cutting and holding the wires and this comprises a pinion 270 which, along with an integral beveled pinion 271, is journaled on the rear end of the pin 255 rearwardly of the rear mounting plate 207. As best seen in Fig. 17 this pinion 270 is adapted to be engaged and operated by a drive gear 272 secured to the shaft 212 rearwardly of such plate 207 and, like the previously described tying gear 257, this gear 272 has only a portion of the periphery toothed. The remainder of the gear's periphery carries a flange 273 which is adapted to enter either of two diametrically opposed notches 274 and 275 in the side of pinion 270 to lock the same in either of two positions, while the teeth are out of mesh.

It may be noted that the gears 257 and 272 are so located upon the shaft 212, or are so timed with respect to each other, that while the gear 257 is driving the tying mechanism, gear 272 is out of mesh with pinion 270 and it is locked, but as the teeth on gear 257, run out of mesh with pinion 256 and lock the tying mechanism the gear 272 will come into mesh with pinion 270 and rotate it a half turn. Thus a complete revolution of the shaft 212, under control of clutch 221, first spins the tying mechanism, while holding the cutting mechanism inoperative, and then reverses the condition by holding the tying mechanism inactive while operating the cutting mechanism. The gears are all, of course, properly timed and synchronized to bring out these actions in proper sequence.

The beveled pinion 271 operates in continuous mesh with a similar gear 276 which is secured to an upright shaft 277 journaled in bearings 278 and a bracket 279 secured to the side 64 of the bale case. At its ends, slightly below and above the slots 264 and 265 respectively, shaft 277 carries upper and lower circular disks 280 and 281 which are so located that the ends of the needles 82 and 83 carrying the pulleys 106 will pass over and clear the respective upper and lower faces of the upper and lower disks. The disks are further so located that, as the needles reach tying positions the pulleys 106 will be positioned at about the center of the disks, as seen in Fig. 9. On the upper surface of the upper disk 280 and lower surface of the lower disk 281, are provided four equally spaced cutting and holding lugs designated at 282, these lugs being disposed flush with the outer circular edges of the disks. Supported adjacent to and inward of the disks 280 and 281 are upper and lower brackets 283 and 284 secured at 285 to the bale case side and having outwardly projecting portions to each of which is rigidly fastened a stationary cutting dog 286 disposed just clear of the path of the lugs 282 on the respective disks. In other words, outer upright surfaces of the lugs 282 will just pass in shearing relation to the vertical faces of the dogs 286 as the disks turn. Also supported from each bracket 283 and 284 is a wire holding or gripping jaw 287 adapted to clear the inner upright surfaces of the lugs 282 as the disks turn, these jaws being located in spaced relation to the dogs 286 so that the lugs pass therebetween, as will be seen in Fig. 9.

Each quarter turn of the disks 280 and 281 is caused to actuate the needle clutch 121 by means of a short lever arm or finger 288 (Figs. 17 and 18) which is secured to the upper end of the previously described shaft 133, opposite the arm 132 carrying the stop roller 131, and which projects over the upper surface of the lower disk 281 into the path of four equally spaced actuating lugs 289 located upon the surface. The lugs 289 are so arranged and disposed that as each engages the finger 288 the shaft 133 will be oscillated to momentarily withdraw the roller 131 from the notch 129 and then permit a half revolution of the clutch plate 128 and shaft 120. This action occurs, as one of the lugs 282 on each disk moves between the dog 286 and jaw 287, and happening also during the time when the needles 82 and 83 are in working positions, causes the resulting half revolution of the crank 119 to swing the needles back out of the machine to their inoperative positions as will be understood.

Forwardly of the wire spinners 243 and 244 and inwardly of the path of the needles 82 and 83 upper and lower wire holding pins 290 and 291 are positioned and these pins are supported for vertical sliding movements in a center bracket 292 secured to the side of the bale case (Fig. 12) and extend at their respective upper and lower ends through openings 293 in vertically spaced pairs of brackets 294 and 295 secured to the adjacent mounting plate 296. The pins 290 and 291 are disposed in vertical axial alignment and the spaces between the brackets 294 and 295 which are traversed by the pins in their normal positions are aligned in this horizontal plane with the centers of the spinners 243 and 244 respectively. At their proximate ends, inwardly of the upper and lower flanges 296 and 297 of the center bracket 292 pins 290 and 291 have heads 298 and 299 which limit the endwise movement of the pins in opposite directions with respect to each other, and said heads have extensions by which they are eccentrically pivoted at 300 to a disk 301. Said disk is secured to a forwardly extending shaft 302 journaled in a bearing 303 in the front mounting plate 296 and rearwardly of said plate the shaft carries a crank or actuating finger 304 which extends first radially from the shaft and then is turned forwardly at its end 305 through an arcuate slot 306 in the plate. Forwardly of plate 296 the crank end 305 is provided with a contact member 307 which is adapted to be engaged momentarily during each complete revolution of the shaft 212 by an arm 308 secured by a hub 309 to the forward end of that shaft. Such engagement is adapted to urge the crank end 305 downward to the lower end of the slot 306 and as the arm 308 then clears contact member 307 the crank is pulled back upwardly to the position shown in Fig. 10 by means of a retractile coil spring 310 stretched between the crank end 305 and a pin 311 on plate 206. Thus once during each complete cycle of operation of the gears 257 and 272, previously described, the crank 304 will be operated to oscillate the shaft 302 in a clockwise direction as viewed in Fig. 12 and the pivots 303 are so located on the disk 301 that this movement will draw the wire holding pins 290 and 291 together or toward each other for a distance such that the respective upper and lower extremities of the pins will clear the spaces between the brackets 294 and 295. This clearing action is only momentary and the pins are immediately returned to normal position by action of the spring 310 which tends to rotate shaft 302 in the opposite direction. With respect to the successive driving operations of the gears 257 and 272 the aforesaid retraction movements of the wire holding pins 290 and 291 is timed to occur just as the gear 272 moves out of mesh with pinion 270 following the quarter turn given disks 280 and 281.

Figure 13:
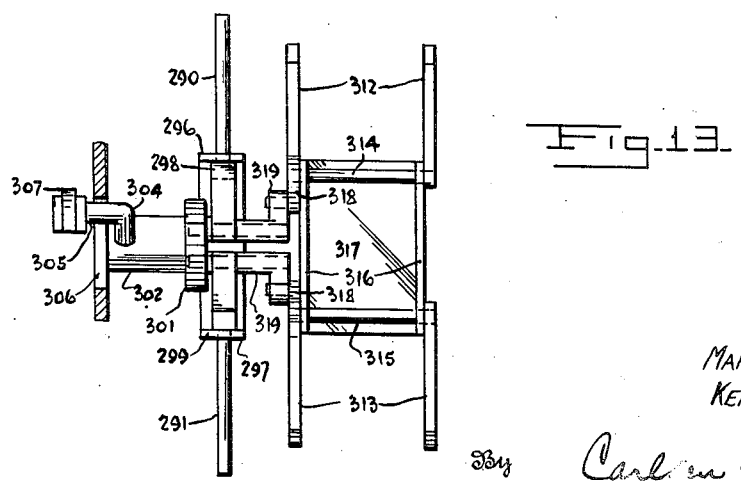
Fig. 13 is a vertical sectional view substantially along the line 13—13 in Fig. 10, but showing certain parts of the wire holding and ejecting elements in side elevation.

Cooperating with the wire holding pins and their operating mechanism is a wire stripping means comprising upper and lower pairs of wire stripper arms 312 and 313, the individual arms of each pair of which are spaced apart and located respectively forward and rearward of the spinners 243 and 244. The stripper arms 312 and 313 are connected at respective lower and upper ends by pins 314 and 315 which are journaled in side flanges 316 (Fig. 13) of a mounting bracket 317 secured to the bale case side and the pivoting arrangement is such that the arms may swing in upright, transverse planes along and across the ends of the spinners. Ears 318 extend from each of the stripper arms 312 and 313 and are connected by links 319 to the pivots 300 on the disk 301, said links being pivotally connected at their ends to, and offset to properly engage, these parts. The links 319 are so arranged that as the disk 301 oscillates to draw the pins 290 and 291 together, the same movement pushes upon the links to rock the stripper arms 312 and 313 inwardly toward the bale case at their free ends. In such operation the stripper arms pass through and inwardly beyond the horizontal planes and alignment existing between the spaces between the brackets 294 and 295 and the centers of the spinners 243 and 244. The stripper arms are, of course, normally held outwardly by the spring 310 and are returned outward following each operation.

In conventional manner the hay is held against expansion during each forward or return movement of the plunger F by hay holding dogs 320 (Figs. 5 and 9) which are pivoted at 321 in brackets secured on the bale case sides 64 and normally extend through slots 322 into the bale chamber. As the plunger moves rearwardly it urges the dogs outwardly as seen in Fig. 9 but they are spring biased to enter the chamber and engage the hay, following each plunger stroke. One or more of such dogs may also be provided in the bottom of the chamber if required.

A rearwardly and outwardly angled shield plate or shelf 323 (Figs. 7 and 17) is secured beneath the upper disk 280 and in operation catches any cut ends of wire and guides them outwardly and rearwardly clear of the mechanism below.

Immediately forward of the needle shaft 84 and substantially at the point reached by the plunger head on its rearward stroke upper and lower wire guide rollers 324 and 325 are journaled in alignment with the respective upper and lower slots 268 and 269 in the right hand side of the bale case. A bracket 326 supports these rollers for rotation about vertical axes.

Threaded rods 327 are arranged vertically at each side of the frame A at the rear end thereof (Fig. 1) and are connected to the upper and lower angles 67 in such manner that springs 328 on upper ends of the rods will exert tension on the angles to compress the angles toward each other and yieldably reduce the vertical dimensions of the frame. Nuts 329 are provided to adjust the tension of the springs 328.

*Operation*

It is thought that the general operation of the machine for picking up, feeding and pressing the hay will be understood without further description herein. It may be pointed out, however, that preliminary to forming the first tied bale, the rear end of the frame A is closed by any suitable means and the bale case from that point forward is caused to become filled with hay which is compressed gradually by action of the plunger until a head is formed against which pressure may be exerted to compress the first bale. Thereafter the hay thus used is expelled from the rear of the frame and each bale as it is tied is forced rearwardly and acts as a wall against which the following bale is pressed. Actually the frame is of such length rearwardly of the tying mechanism that several tied bales remain therein and the rearmost of the string is expelled as each new bale is formed. No separating boards are required at any time.

The density or weight of the bales is regulated by the nuts 329 which adjust the springs 328 in usual manner to increase or decrease the resistance on the discharging bales.

Turning now to a description of the tying operation the procedure will be first set out as it occurs from the setting up of the tying mechanism through the formation of the first tied bale.

The wires W and W¹ are pulled off from the spools 93 and 94, strung through the pulleys 105 and then through the needles 82 and 83 as seen in Fig. 4, the ends of the wires finally being drawn from the pulleys 106 at the ends of the needles toward the machine. These ends of the wires are then passed across forward sides of the guide rollers 324 and 325, pulled transversely through the baling chamber and turned outwardly and rearwardly around the forward sides of the wire holding pins 290 and 291, it being understood that the wires pass through the spaces between the brackets 294 and 295 in engaging the pins. From the pins the wire ends extend rearwardly alongside the spinners 243 and 244, outwardly thereof, and at rear extremities are gripped between the lugs 282 and gripping jaws 287 as clearly seen in Fig. 9. Ordinarily this operation of stringing the wires across the bale chamber and securing the ends occurs as the tying operation takes place, as will presently appear.

Now as the bale accumulates in the chamber its rear end pressing against the wires W and W¹ stretched across the chamber will force the wires rearwardly and as this occurs additional wire is paid off from the spools 93 and 94 through the needles so the length of each wire in the baling chamber increases as necessary to accumulate the bale. The wires assume then a U-shape with a rear end portion 330 and side portion 331—332 to fit sides of the bale as seen in Fig. 9, and the tension on the spools is such that the wire is stretched tightly around the bale. The rollers 324 and 325 facilitate the feeding movement of the wires as the bale increases in length while the slots 264 and 265 and 268—269 in the bale case sides provide clearance for the wires.

As the bale is accumulated and travels past the metering mechanism the star wheel 133 is rotated and when the bale is of selected length the notch 153 in disk 152 is opened and receives the lug 151 on the actuating bar 143 so that the bar springs into alignment with slide bar 170. Upon the next rearward compression stroke of the baling plunger F the bar 143 is moved endwise by action of the eccentric 169 and the rock shaft 146 is thus oscillated to pull upon actuating rod 176 and oscillate shaft 133 to swing the stop roller 131 out of the notch 129 in needle clutch 121. Immediately as this occurs the needle crank 119 moves inward through a half revolution, swinging the needles 82 and 83 into the machine to tying positions. The same action latches the plunger F due to the forward movement of the latch bar 182 as previously described and as these operations are initiated the finger 161 on the stop member 155 of the metering mechanism snaps past the end of the stop bar 162 closing the notch 153 so that, on the next forward return stroke of the plunger F, the metering mechanism will be restored to operative condition for metering the next bale. The plunger in its rearward locked condition maintains pressure on the forward end of the bale, while the operation of tying the bale proceeds.

As the needles 82 and 83 swing inward they carry the taut stretches 333 (Fig. 9) of the wires W and W¹, existing between the right forward corners of the bale and the pulleys 106, around the forward end of the bale and rearwardly around the wire holding pins 290 and 291 in lapping relation to the ends 334 of the side portions 332 where they pass along the spinners 243 and 244 and are gripped by the lugs 282 and jaws 287. The wires are then placed around both sides and ends of the bale, ready for tying.

Figure 24:
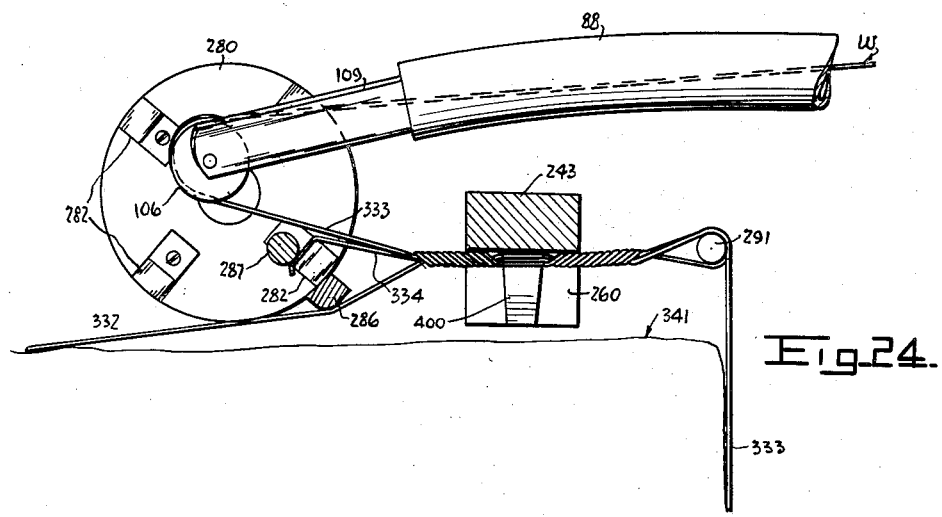
Figs. 24 and 25 are similar enlarged fragmentary plan views, partially in section, illustrating two stages of the tying operation.
Figure 25:
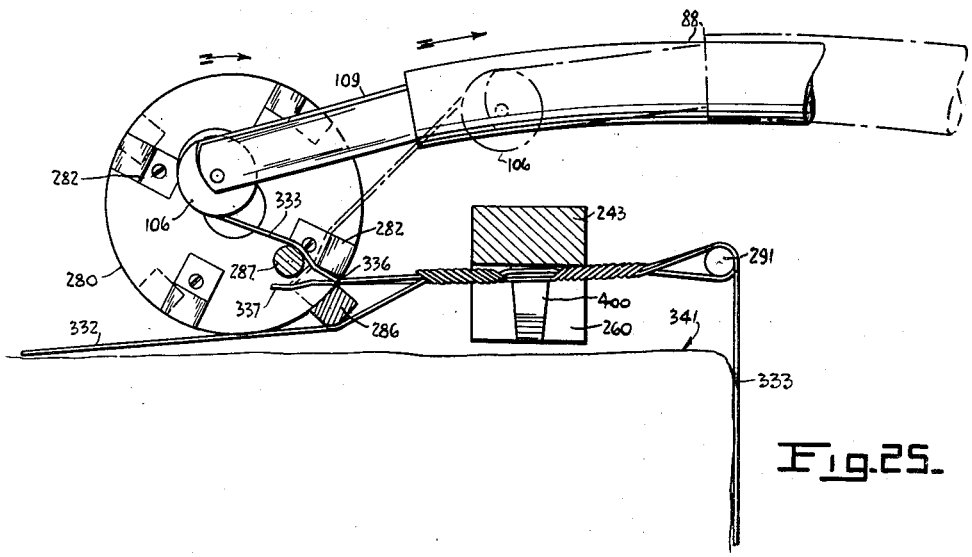

As the needles 82 and 83 reach their working positions the tying clutch 221 is engaged in response to the travel of the crank 119 past the finger 241 on shaft 239, which pulls upon rods 236 and 230 and swings arm 226 outward causing the stop roller 225 to clear the notch 224. The shaft 212 is thus set in motion and makes one complete revolution until the clutch 221 is again disengaged and locked by the roller 225. The first part of the revolution of the shaft 212 causes tying gear 257 to mesh with and drive the pinion 256 and through the gears 254 and 251 rotate the spinners 243 and 244. The side portions 332 of the wires W and W¹ as they are drawn out by the accumulating bale are caused to extend through the slots 260 in the spinners as clearly shown in Fig. 9, and now as the spinners rotate, these portions of the wires are carried toward the center of the spinners, and as the latter make their first one-half revolution the slots 260 are turned outwardly toward and into alignment with the overlapping wires 334 and 333 so that these wires may also enter the slots. Continuation of the spinning action through several complete turns will then twist the three lapping wire portions together as seen in Figs. 24 and 25, joining the side portions 332 and end portions 333 of both upper and lower wires. It may here be stated that the wires 333 and 334 will snap into the slots 260 as they come around to the outside due to the bend and tension placed in these wires as they are stretched between the pins 290 and 291 and the rollers 106 and jaw 287 respectively as will be clearly evident in Fig. 9.

As the spinning and twisting action is completed the gear 257 moves out of mesh with the pinion 256 and locks the tying mechanism with the slots 260 of the spinners 243 and 244 turned inwardly again and the gear 272 then comes into mesh with the pinion 270 to cause a one-quarter revolution to be imparted to the disks 280 and 281. Such movement of the disks first releases the previously held ends 334 of the now twisted wires, due to passage of the lugs 282 from between the cutting dogs 286 and the gripping jaws 287, and as the next lugs approach these positions they (see Figs. 15 and 25) engage the ends of the wires 333, adjacent the points at which said wires extend rearwardly from the pulleys 106 on the needles 82 and 83, and force these portions of the wires between the dogs 286 and the jaws 287. The wires are severed at the point 336 (Fig. 25) by the shearing action of the lugs 282 and the dogs 286, freeing the twisted parts of the wires, while the portions still passing around the pulleys 106 are forced between the lugs and the gripping jaws 287 and there held at their ends. The previously gripped ends of the wires are cut off by the same action and these short ends, indicated at 337 in Fig. 25, fall clear.

Immediately as the twisted wires are freed by the cutting action just described, the arm 308 trips the crank 304 to oscillate the disk 301 and retract the wire holding pins 290 and 291 causing them to move respectively downwardly and upwardly and clear the wires where they loop rearwardly around the pins. The same action of the disk 301 swings the stripper arms 312 and 313 inwardly and they will engage the twisted portions of the wires to force them from the slots 260 in the spinners 243 and 244, so that the wires, now tied around the bale, are entirely free of the tying mechanism and the bale may move rearwardly as the next one is pressed.

While the twisted wires are thus being freed from the tying mechanism, the previously described quarter turn of the disks 280 and 281, which cuts the wires, causes one of the lugs 289 (Figs. 17 and 18) to engage the finger 288 and swing the stop roller 131 out of notch 130 into which it previously dropped as the needle clutch 121 completed its first one-half revolution. This clutch being thus reengaged causes a further one-half revolution to be imparted to the needle crank 119, which then travels outwardly and back to starting position 119ᵃ in Fig. 19, swinging the needles back out of the machine to their normal positions. Since the ends of the wires passing off the pulleys 106 are now gripped by the jaws 287 as indicated in broken lines in Fig. 25, this return movement of the needles will stretch the wires across the baling chamber E in position to engage the rear end of the next bale as it starts to accumulate in the chamber.

The operation is completed by the unlatching of the plunger F which occurs as a result of the rearward movement of the latch bar 182 by the needles as they approach normal positions and clear the plunger. Such rearward movement of latch bar 182 enables the spring 299 to pull the latches 201 downward clear of the plunger and the next forward stroke of the crank 50 will then cause the strain release connection 205 to connect the rod sections 73ᵃ and 73ᵇ and again impart reciprocating movements to the plunger.

The foregoing actions are repeated each time a bale of selected length is accumulated and it will be evident, therefore, that the baling and tying actions may be continuously carried on, resulting in the rapid baling of the hay or other material. The tying action is initiated by the bale metering mechanism, which first operates the needle clutch to swing the needles toward working positions, this operation then latching the plunger. The movement of the needles further controls the beginning of the tying operation, through operation of the finger 241 by needle crank 119, and the tying, cutting and stripping operations proceed in sequence, with the return movement of the needles controlled and initiated by the cutting of the wires through action of the lugs 289 upon the needle clutch actuating finger 288. The series of interrelated operations take place in exactly timed sequence but very rapidly, and the plunger need not be latched more than the time normally required for two comlete back and forth movements at the most.

Attention is called to Fig. 15 wherein it is shown that the pulley 106 for the upper needle 82 is disposed at an angle such that as the lugs 282 on the upper disk 280 move around toward the bale case they will clear the outer wire W where it passes rearwardly from the pulley, whereas the lugs will engage and cut off and hold the two extremities of the end portion 334 of the wire inwardly of the pulley. The pulley in the lower needle 83 will of course be angled for the same purpose, but in an opposite direction since the lugs 282 are on the underside of the lower disk 281. Also in this view the lugs 282 (only one of which is shown) are shown as provided with base portions 338 which are seated in recesses 339 in the disk and secured therein by screws 340.

It will be noted, in Figs. 24 and 25, that the twisted ties formed in the wires at first stand outward from the forward left hand corner 341 of the bale so that the wires appear to be loose on the bale. As the wires are released from the tying mechanism and the baling proceeds, however, the normal expansion of the bale will tighten the wires, so that there will be no tendency for the wires to come off as the bales are handled.

As best seen in Figures 12, 24 and 25 the slots 260 in the spinners 243—244 are not the same width across the full length of the spinners but at their centers have tongues 400 which reduce their width to one just sufficient to receive the wires side by side. The twists in the wires may thus be formed closely together and may run into the opposite ends of the spinners as clearly seen in Figs. 24 and 25. The surfaces of the tongues 400 diverge toward the open sides of the slots as indicated at 401 in Fig. 14 to facilitate the delivery of the wires from the spinners as the ties are completed.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a baler, mechanism for tying the bales with lengths of wire taken from a coil thereof, comprising a needle operative to dispose a length of the wire drawn from the coil around each bale, means for holding portions of the wire in tying relation, means for twisting said portions together as they are held, cutting means for cutting the twisted portions of the wire free from the length of wire carried from the coil by the needle, means for releasing the twisted wires from said holding means, and separate means operating sequentially for actuating the wire twisting, cutting off and releasing means.

2. A baling machine of the character described including a baling chamber and mechanism for forming a bale therein, means for tying the bale with at least one wire, comprising mechanism operative to dispose the wire around the bale with portions of the wire in overlapping relation, separate means for engaging and holding the overlapping portions of the wire at spaced points, means arranged between said wire holding means for twisting said overlapping portions of the wire together, means for operating the said wire twisting means, means for releasing the wire from the said separate holding means, and movable means for forcing the twisted portion of the wire clear of the wire twisting means toward the bale.

3. A baling machine of the character described including a baling chamber and mechanism for forming a bale therein, means for tying the bale with at least one wire, comprising mechanism operative to dispose the wire around the bale with portions of the wire in overlapping relation, separate means for engaging and holding the overlapping portions of the wire at spaced points, a rotatable wire twisting member arranged between said wire holding means and having a slot adapted to receive said overlapping portions of the wire for twisting them together as the member rotates, means for rotating the said wire twisting member through a selected number of revolutions and for bringing the member to rest with the slot therein opening toward the bale, means for releasing the wire from the said separate holding means, and members swingably arranged adjacent the ends of the twisting member and adapted to swing toward the bale to engage the twisted wire and urge it free of the slot in the said twisting member.

4. In a baling machine, a baling plunger, power operated means for reciprocating the plunger, at least one tying needle movable to and from a tying position, a clutch for actuating the needle, means responsive to accumulation of a bale by the plunger for first actuating the clutch to swing the needle toward and to tying position, and means actuated by such movement of the needle for locking the plunger against reciprocating motion, said last mentioned means being also operative in response to opposite movement of the needle for releasing the plunger.

5. In a baling machine, means for accumulating a bale therein and including a plunger, a power unit for reciprocating the plunger, latch means for arresting the motion of the plunger, a tying mechanism, at least one needle swingable to and from tying position, a clutch for operatively connecting the power unit to the needle for swinging the later, means operative by the accumulating bale for engaging the clutch to swing the needle, and means operative directly in response to the movement of the needle for actuating the latch means for the plunger.

6. In a baling machine, means for accumulating a bale therein and including a plunger, a power unit for reciprocating the plunger, latch means for arresting the motion of the plunger, a tying mechanism, at least one needle swingable to and from tying position, a clutch for operatively connecting the power unit to the needle for swinging the latter, means operated by the accumulating bale for engaging the clutch to swing the needle to tying position, means operative directly in response to the movement of the needle for actuating the latch means and latching the plunger, and means operative upon completion of the operation of the tying mechanism for again engaging the clutch to swing the needle away from tying position and unlatching the plunger.

7. In a baling machine, means for accumulating a bale therein and including a plunger, a power unit for reciprocating the plunger, latch means for arresting the motion of the plunger, a tying mechanism for tying the bale, at least one tying needle movable from a normal position to a tying position and return, a clutch adapted upon successive momentary engagements to move the needle to tying position and back to normal position, means for first engaging the clutch to move the needle to tying position, means operated by such motion of the needle for actuating the latch means and arresting the plunger, and means operative by the tying mechanism for next engaging the clutch to return the needle to normal position and releasing the latch means to free the plunger.

8. In a baling machine, means for accumulating a bale therein and including a plunger, a power unit for reciprocating the plunger, latch means for arresting the motion of the plunger, a tying mechanism for tying the bale, at least one tying needle movable from a normal position to a tying position and return, a clutch adapted upon successive momentary engagements to move the needle to tying position and back to normal position, means for first engaging the clutch to move the needle to tying position, means operated by such motion of the needle for actuating the latch means and arresting the plunger, a clutch for actuating the tying mechanism from the power unit, means responsive to movement of the needle to tying position for engaging the clutch actuating the tying mechanism, and means responsive to completion of the tying operation for reengaging the clutch operating the needle to return said needle to normal position, said return movement of the needle being operative to release said latch means and free the plunger.

9. In a baling machine, a reciprocating plunger, a latch means for arresting the plunger, said latch means including an actuating member operative in response to movement in one direction for latching the plunger and adapted to unlatch the plunger when moved in the opposite direction, and a rotatable tying needle operating member, said actuating member being connected eccentrically to said needle operating member for reciprocation in response to rotation of the operating member.

10. In a baling machine, means for tying a bale accumulated therein, and means operative for initiating the tying operation including a movable actuating member, said member having a lug, a disk having a normally closed notch adapted when opened to receive the lug, a reciprocating bar, said actuating member being arranged to move into the path of the bar when the lug enters said notch whereby said bar will move the actuating member and initiate the tying operation, a metering wheel operated by the accumulation of a bale, and means operated by said wheel for actuating the disk and periodically opening the notch therein.

11. In a baler, mechanism for tying bales accumulated therein with wire taken from a continuous length, comprising means for arranging a portion of the wire around each bale, said means including a movable needle member operative upon movement in one direction to carry a portion of the wire into tying position around a bale, means for tying the wire thus disposed around the bale, means for cutting off the wire carried by the needle from the wire just tied by said tying means, and means responsive to the completion of the cutting off operation for moving the needle member in an opposite direction to dispose a new portion of the wire in position for arrangement around the next bale as it is accumulated.

12. In a baler, mechanism for tying bales accumulated therein with wire taken from a continuous length, comprising means for arranging a portion of the wire around each bale, said means including a movable needle member operative upon movement in one direction to carry a portion of the wire into tying position around a bale, means for tying the wire thus disposed around the bale, means for cutting off the wire carried by the needle from the wire just tied by said tying means, means for stripping and releasing the tied wire from the tying means, and means initiated by the completion of the operation of the cutting off means for moving the needle member in an oppostie direction to initiate the arrangement of a new portion of wire around the next bale as it is accumulated.

13. In a baling machine including in its parts a plunger for forming a bale, a needle movable to and from a tying position and operative to dispose a wire around the bale, a plunger arresting latch for holding the plunger against the bale as it is tied, a wire tying mechanism, and a power source for operating the plunger, needle and tying mechanism, means for actuating and controlling the sequence of operation of said parts, comprising a bale metering mechanism operative to first initiate movement of the needle toward tying position, means operated by movement of the needle to then actuate the latch and arrest the plunger, means operative by operaion of the needle for next starting the tying mechanism in operation, and means responsive to completion of the tying operation for returning the needle to starting position and unlatching the plunger.

14. In a baling machine including in its parts a plunger for forming a bale, a needle for positioning a wire around a bale, a wire tying mechanism and a latch means for arresting the plunger while the needle places the wire around the bale and while the wire is tied and the needle withdrawn, means for actuating said parts comprising a first power actuated clutch, bale metering means operative when a bale is accumulated to actuate the clutch and move the needle to tying position, means operative by said movement of the needle for operating said latch means and arresting the plunger, a second power actuated clutch, and means actuated by the first clutch as it moves the needle to actuate the second clutch and operate said tying means.

15. In a baling machine including in its parts a plunger for forming a bale, a needle for positioning a wire around a bale, a wire tying mechanism and a latch means for arresting the plunger while the needle places the wire around the bale and while the wire is tied and the needle withdrawn, means for actuating said parts comprising a first power actuated clutch, bale metering means operative when a bale is accumulated to actuate the clutch and move the needle to tying position, means operative by said movement of the needle for operating said latch means and arresting the plunger, a second power actuated clutch, means actuated by the first clutch as it moves the needle to actuate said second clutch and operate said tying mechanism, and means responsive to completion of the tying operation for again operating the first clutch to return the needle to initial position and unlatch the plunger.

16. In a baling machine having a bale tying mechanism and a needle movable to and from a tying position, a pair of power operated clutches, one clutch being operative to move the needle and the other to operate the tying mechanism, and the clutch operating the tying mechanism being operatively arranged for control by the clutch moving the needle.

17. In a baler having a movable needle, a tying mechanism and a bale metering mechanism, a power operated clutch connected to operate the needle and another power operated clutch connected to operate the tying mechanism, means responsive to operation of the bale metering mechanism for actuating the needle operating clutch, and means operated by said needle operating clutch for actuating the clutch controlling the tying mechanism.

18. In a baling machine having a device movable by an accumulating bale, a tying mechanism, and a needle movable between two positions, a power driven clutch for actuating the needle, means responsive to movement of said device for first actuating the clutch to move the needle from a first to a second position, and means actuated by the tying mechanism for actuating the clutch a second time to return the needle to its first position.

19. In a baling machine including a plunger for accumulating a bale and a tying mechanism including a needle movable to and from a tying position, means for arresting the plunger responsive to movement of the needle toward said tying position comprising a latch, and means operated by the needle for placing the latch under spring tension, said plunger having means for engagement by the latch under said tension when said means on the plunger comes in registry with the latch.

20. In a baling machine having means for accumulating a bale, means for placing a wire around the bale, and means for tying the wire, the combination comprising means for holding the wire while it is tied and including a pin about which the wire is looped while being tied, a member supporting the pin for endwise movement when the wire is to be released, and means responsive to completion of the typing operation for moving the pin to release the wire.

21. In a baling machine having means for accumulating a bale, means for placing a wire around the bale, and means for tying the wire, the combination comprising means for holding the wire while it is tied and including a pin about which the wire is looped while beng tied, a member supporting the pin for endwise movement when the wire is to be released, means responsive to completion of the tying operation for moving the pin to release the wire, said tying means including a twisting member, and a swingable stripper member actuated by movement of the pin and operative to strip the wire from said twisting member when the wire is released from the pin.

22. The combination in a bale typing mechanism for tying a bale with upper and lower wires, of upper and lower wire holding pins movable in upright planes, and means connecting the pins and operative to pull the upper pin downward and the lower pin upward to release the wire when the tying operation is completed.

23. The combination in a baler having tying mechanism for tying each bale with a wire, of means for holding the wire comprising a member having spaced portions through which the wire is passed and said portions being apertured, a pin movable in and through said apertured portions and normally traversing the space therebetween to catch the wire, and means for retracting the pin from said space to clear the wire.

24. In a baling machine having means for accumulating a bale and means for tying the bale, said tying means being adapted to be set in operation by the momentary operation of a reciprocable actuating member, means for setting said tying means in operation, comprising a power operated device for operating said actuating member, means normally holding the actuating member out of endwise alignment with said power operated device, and a rotary member adapted to be rotated by the bale as it accumulates, said rotary member including means operative in one position thereof for bringing the actuating member into endwise alignment and engagement with said power operated device for movement endwise thereby.

25. In a baling machine including a plunger for accumulating a bale and a tying mechanism, the combination comprising a needle movable to and from a tying position for disposing a wire around the bale, and a latch for arresting the plunger while the needle travels, said latch being operated by and under control of movement of the needle.

26. The combination in a baling machine having a plunger and a tying mechanism, of a needle movable to and from operative relation with said tying mechanism, a latch for arresting the plunger while said needle is moved and the tying mechanism is operated, a member for actuating the latch, and an eccentric connection between said member and the needle whereby movement of the needle will control the latch.

27. In a baling machine having a device movable by an accumulating bale, a tying mechanism, and a needle movable between two positions, a power transmission means for actuating the needle, means responsive to movement of said device for first actuating the power transmission means to move the needle from a first to a second position, and means actuated by the tying mechanism actuating the power transmission means a second time to return the needle to its first position.

28. In a baling machine including in its parts a plunger for forming a bale, a needle for positioning a wire around a bale, a wire tying mechanism and a latch means for arresting the plunger while the needle places the wire around the bale and while the wire is tied and the needle withdrawn, means for actuating said parts comprising a first power transmitting clutch, means for actuating said clutch when a bale is completed to thereby move the needle to tying position, means operative as the needle moves toward tying position for operating the latch means and arresting the plunger, a second power transmitting clutch, means actuated as the needle moves to tying position for actuating the said second clutch and thereby operate the said tying mechanism, and means responsive to completion of the tying operation for again operating the first clutch to return the needle to initial position and unlatch the plunger.

29. In a baling machine having a device movable by an accumulating bale, a tying mechanism and a needle movable to and between starting and tying positions, power transmission means including a first clutch for moving the needle, means responsive to movement of said device for first actuating the clutch to move the needle from starting to tying position, a second clutch, means operative by such movement of the needle for actuating the second clutch to operate the tying mechanism, and means operative on completion of the tying operation for again actuating the first clutch to return the needle to starting position.

MARTIN RONNING.
KENNETH M. KEITH.

REFERENCES CITED

The following references are of record in the file of this patent:

UNITED STATES PATENTS

| Number | Name | Date |
| --- | --- | --- |
| 894,876 | Clark | Aug. 4, 1908 |
| 994,662 | Schubert | June 6, 1911 |
| 1,205,949 | Thomas | Nov. 21, 1916 |
| 1,213,993 | Zachow | Jan. 30, 1917 |
| 1,257,465 | Dudley | Feb. 26, 1918 |
| 1,297,450 | Davis | Mar. 18, 1919 |
| 1,545,407 | Drew et al. | July 7, 1925 |
| 1,581,794 | DeHaven, Jr. | Apr. 20, 1926 |
| 1,624,157 | Carroll | Apr. 12, 1927 |
| 1,821,389 | McChesney | Sept. 1, 1931 |
| 1,889,372 | Nolan | Nov. 29, 1932 |
| 2,355,644 | Haase | Aug. 15, 1944 |